(12) United States Patent
Hunton

(10) Patent No.: US 7,194,039 B2
(45) Date of Patent: *Mar. 20, 2007

(54) METHOD FOR PEAK POWER REDUCTION IN MULTIPLE CARRIER COMMUNICATIONS SYSTEMS

(75) Inventor: Matthew J. Hunton, Liberty Lake, WA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 10/200,240

(22) Filed: Jul. 22, 2002

(65) Prior Publication Data

US 2002/0191709 A1 Dec. 19, 2002

Related U.S. Application Data

(63) Continuation of application No. 09/884,302, filed on Jun. 19, 2001, now Pat. No. 6,449,303.

(60) Provisional application No. 60/212,892, filed on Jun. 20, 2000.

(51) Int. Cl.
*H04K 1/10* (2006.01)
*H04K 1/02* (2006.01)
*H04L 27/28* (2006.01)

(52) U.S. Cl. .................................. 375/260; 375/296

(58) Field of Classification Search ................ 375/130, 375/260, 284, 285, 295, 296, 346; 725/143; 455/3.03; 370/342, 480; 330/149

See application file for complete search history.

(56) References Cited

U.S. PATENT DOCUMENTS

| 3,898,566 | A  | * | 8/1975 | Switzer et al. | ............. | 455/3.03 |
| 5,125,100 | A  | * | 6/1992 | Katznelson | ................. | 725/143 |
| 6,449,303 | B2 | * | 9/2002 | Hunton | ....................... | 375/130 |
| 6,590,906 | B1 | * | 7/2003 | Ishida et al. | ................ | 370/480 |
| 2002/0012403 | A1 | * | 1/2002 | McGowan et al. | ......... | 375/295 |
| 2002/0047745 | A1 | * | 4/2002 | Kolanek | ..................... | 330/149 |

\* cited by examiner

*Primary Examiner*—Don N. Vo
(74) *Attorney, Agent, or Firm*—Myers Dawes Andras LLP

(57) ABSTRACT

A system and method for signal peak reduction in a multiple carrier communication system where the individual carriers are produced from input symbols that are filtered to reduce individual carrier bandwidths, offset in frequency, and combined into an output signal. A multiple carrier peak reduction unit is provided which modifies the input carrier symbols so that the combined output signal does not exceed a predetermined peak limit value. The multiple carrier peak reduction unit includes filter predictors that predict the effect of each channel filter on that carriers input symbols by using filter coefficient values corresponding to the impulse response function of each filter. The filter predictor outputs are then phase shifted, in correspondence to frequency offsets provided for in multiple carrier signal generation, and combined to produce a prediction of the combined signal output which is then processed to determine the corrections required to the individual channel symbol inputs.

30 Claims, 40 Drawing Sheets

METHOD FOR PEAK POWER REDUCTION IN MULTIPLE CARRIER COMMUNICATIONS SYSTEMS

RELATED APPLICATION INFORMATION

The present application is a continuation application of U.S. Ser. No. 09/884,302 filed Jun. 19, 2001 now U.S. Pat. No. 6,449,303, which claims priority under 35 USC 19 (e) of provisional application Ser. No. 60/212,892 filed Jun. 20, 2000, the disclosure of which is incorporated herein by reference in its entirety.

BACKGROUND OF THE INVENTION

1. Field of the Invention

The present invention relates to wireless communications systems, and signal processing apparatus employed in wireless communications systems. More particularly, the present invention relates to communications systems that transmit simultaneously on multiple carriers.

2. Background of the Prior Art and Related Information

Wireless communications systems employing transmission between base stations and remote users are a key component of the modern communications infrastructure. These wireless systems are being placed under increasing performance demands which are taxing the capability of available equipment, especially wireless base station equipment. These increasing performance demands are due to both the increasing numbers of users within a given wireless region, as well as the bandwidth requirements allocated to wireless system service providers. The increasing number of wireless users is of course readily apparent and this trend is unlikely to slow due to the convenience of wireless services. The second consideration is largely due to the increased types of functionality provided by wireless systems, such as wireless Internet access and other forms of wireless data transfer over such systems. These considerations have resulted in a need for more carriers operating from each transmitting location of a wireless service network.

When transmitting multiple carriers from a single location, it is advantageous to combine carriers as early in the signal generation process as possible. By doing so, the transmitting location can reduce the number of antennas, low loss cables and power amplifiers. The ultimate goal is to combine individual channels with digital signal processing before RF signal generation. In some multiple carrier systems like OFDM (orthogonal frequency division multiple access), it is best to combine carriers with digital signal processing in order to maintain the required orthogonal carrier characteristics.

An example of a prior art multiple carrier signal generator is shown in FIG. 1. Information symbol streams are input from the individual carrier data handling systems. These symbols are generally complex valued data points that represent one or more information data bits to be transmitted. The symbol streams are then upsampled to a higher sample rate by inserting equally time spaced zero valued samples between the input symbols. The upsampled symbol streams are then passed through baseband filters to create the individual carrier baseband signal waveforms. After the individual carrier baseband signals are created, each carrier is offset in frequency and combined producing a multiple carrier communication signal. This signal is then digital-to-analog converted and up-converted in frequency to the desired operating bandwidth.

A problem exists, however, with the above multiple carrier generation process. Individual carriers in the above process obey power statistics that are a function of the symbol generation process used and the baseband filter impulse response function characteristics. These individual carrier power statistics are generally described by the carrier power complementary cumulative probability density function (CCDF), and from that function, the signal power peak-to-average ratio. Signals with high peak-to-average ratios create problems in digital-to-analog conversion, RF signal generation, and RF power amplification. Even if the peak-to-average power ratios of individual carriers is low, or can be maintained below a maximum level using signal-processing algorithms, combining these multiple carriers may produce high peak-to-average ratios. These high multi-carrier peak-to-average ratios once again cause problems in digital-to-analog conversion, RF signal generation, and RF power amplification.

Signals with high peak-to-average ratios cause the following problems in communications systems. First, the number of significant digits used to calculate the signal must be large enough to maintain adequate signal resolution when the signal is both very large and very small. Second, at the output of the digital signal processor are digital-to-analog converters. To accommodate a digital signal with a high peak-to-average ratio, high bit count digital-to-analog converters must be used so that both large and small values can be generated. If this is not done the output signal will have a poor output signal-to-noise ratio. Finally, signals with high peak-to-average ratios require very linear analog, IF, RF and RF power amplifier circuits. Without these very linear circuits, distortion products are generated at frequencies outside the government allocated bandwidth of the wireless system license. Such highly linear circuits are expensive, however, and add considerable cost to the system.

Accordingly, a problem presently exists in multiple carrier communication systems due to large peak-to-average power ratios occurring after carrier combination.

SUMMARY OF THE INVENTION

The present invention provides a system and method for signal peak reduction in a multiple carrier communication system where the individual carriers are produced from input upsampled symbols that are filtered to reduce individual carrier bandwidths, offset in frequency, and combined into an output signal.

In a first aspect, the present invention provides a multi-carrier communication system. The multi-carrier communication system comprises a plurality of separate carrier signal sources, each providing symbols corresponding to one or more data channels. A peak reduction stage is coupled to receive the plurality of separate carrier symbols and outputs peak reduced symbols for each carrier based on the effect of the other carriers. A frequency offset stage is provided for shifting the frequency of each carrier signal and a combining stage combines the frequency shifted carrier signals into a multi-carrier signal. An RF up conversion stage may be configured before or after the combining stage. Also, a digital-to-analog conversion stage for converting carrier symbols to analog signals may be configured before or after the combining stage.

The peak reduction stage preferably comprises a phase shift circuit providing a separate frequency offset output for each carrier, a summing circuit summing the frequency offset outputs, an algorithm processor receiving the output of the summing circuit and calculating symbol adjustment values based on the output of the summing circuit and a peak power limit value, and a combining circuit combining symbol adjustment values and input carrier symbols. The multi-carrier communication system of the present invention, may further comprise a plurality of filters equal to the number of separate carriers coupled to the output of the peak reduction stage. In such an embodiment, the peak reduction stage preferably further comprises a filter predictor for each filter, wherein the filter predictor outputs are provided to the phase shift circuit.

In a further aspect the present invention provides a multi-carrier communication system, comprising a plurality of separate carrier signal sources, each providing a stream of carrier symbols corresponding to one or more data channels A plurality of filters equal to the number of separate carriers each provides a filtering operation based on a filter impulse response function. A peak reduction unit is coupled between the plurality of carrier signal sources and the plurality of filters and receives the carrier symbols from the plural carrier signal sources. The peak reduction unit includes a plurality of filter predictors which provide predicted filtered outputs for each of the plurality of filters using filter coefficient values corresponding to samples of the filter impulse response function of each of the filters. The peak reduction unit further includes a peak reduction algorithm circuit block for receiving the predicted filtered outputs and determining peak reduction values for each stream of carrier symbols, and a plurality of combiners combining the peak reduction values and carrier symbols and providing peak adjusted carrier symbols. The peak reduction unit may further comprise a plurality of delay circuits for delaying the carrier symbols so that the plurality of combiners receive the peak reduction values and the carrier symbols on a symbol-by-symbol basis in a time synchronized manner. The multi-carrier communication system further comprises a plurality of frequency offset circuits equal in number to the plurality of separate carrier signals and a carrier combiner for combining the outputs from the plural frequency offset circuits to provide a multi-carrier output.

The multi-carrier communication system may further comprise a digital-to-analog converter for converting the multi-carrier output to a multi-carrier analog signal and an RF mixer for mixing the multi-carrier analog signal with an RF carrier and providing a multi-carrier RF output. A plurality of up sampling circuits, coupled between the peak reduction unit and each of the filters, may also be provided for increasing the sampling rate of the peak adjusted carrier symbols prior to filtering. The up sampled symbols are then filtered at the up sampled filter rate.

A number of other features and different embodiments may also be provided. For example, at least some of the filters may employ different impulse response functions and the filter predictors receive filter coefficients corresponding to the different filter impulse response functions. The peak reduction unit may comprise a plurality of weighting circuits for weighting the peak reduction values based on the instantaneous power of each carrier. Each of the combiners may comprise a multiplier circuit and the peak reduction value comprises a gain which when multiplied by the carrier symbol provides an adjusted carrier symbol. Alternatively, each of the combiners may comprise an addition circuit and the peak reduction value comprises a value which when added to the carrier symbol provides an adjusted carrier symbol. The peak reduction algorithm circuit block may comprise a phase shift circuit for phase shifting each filter predictor output and an algorithm processor for calculating peak reduction values. The peak reduction algorithm circuit block may further comprise a summer for summing the phase shifted filter predictor outputs and providing an output to said algorithm processor. The peak reduction algorithm circuit block may further comprise a magnitude detection circuit for detecting the magnitude of the summer output and a comparator for comparing the magnitude of the summer output to a peak limit value. The peak reduction algorithm circuit block may further comprise a selector switch coupled to the comparator and enabling the peak reduction value to be output to a combiner when said switch is enabled by the comparator. The peak reduction unit may further comprise a plurality of feedback loops which provide the peak reduction values to the filter predictors. The filter predictors may each include a memory register comprising a plurality of delay stages and the feedback loops provide said peak reduction values to said memory registers between the delay stages. The peak reduced carrier symbols may be output from the memory registers.

In yet another aspect, the present invention provides a multi-carrier communication system, comprising a plurality of separate carrier signal sources, each providing a stream of carrier symbols corresponding to one or more data channels and a plurality of up sampling circuits, corresponding to the number of separate carrier signal sources, for increasing the sampling rate of symbols input thereto and providing up sampled symbols. The multi-carrier communication system further comprises a plurality of filters for providing filtering operations based on one or more filter impulse response functions and employing filter coefficients corresponding to a timing based on the increased sampling rate. A peak reduction unit is coupled between the plurality of separate carrier signal sources and the filters and receives the carrier symbols from the signal sources and provides peak adjusted carrier symbols. The peak reduction unit includes a plurality of peak reduction stages, each stage predicting the effect of the filters on the data symbols using filter coefficient values corresponding to a portion of the total number of sample points of the filter impulse response function to provide predicted filtered outputs and providing a peak reduction processing based on predicted filter outputs. The peak reduction unit provides the peak adjusted carrier symbols, after the plural stage peak reduction processing, to the filters. The multi-carrier communication system further comprises a plurality of frequency offset circuits, equal in number to the number of separate carrier signal sources, for forming frequency offset carrier signals corresponding to the peak adjusted carrier symbols, and a combiner for combining the frequency offset carrier signals to form a multi-carrier signal.

A number of various features and different embodiments may also be provided. For example, the plural stages of the peak reduction unit may be provided in series. Alternatively, the plural stages of the peak reduction unit may be provided in parallel. Also, each stage of the peak reduction unit may comprise a plurality of filter predictors receiving filter coefficients corresponding to a portion of the total number of sample points of the filter impulse response function and providing said predicted filtered outputs, and a peak reduction algorithm circuit block for calculating a peak reduction value based on the predicted filtered outputs provided by the filter predictors. Each stage of the peak reduction unit may thus apply N filter coefficients to the filter predictors corresponding to N sample points of the impulse response function.

In yet another aspect, the present invention provides a method for signal peak reduction in a multiple carrier communication system where the individual carriers are produced from input symbols that are filtered to reduce individual carrier bandwidths, offset in frequency, and combined into an output signal. The method comprises predicting the effect of filtering on input symbols for each carrier and providing predicted filtered symbols for each carrier. The predicted filtered symbols are phase shifted by a separate amount for each carrier and combined. Peak reduction adjustment values for each carrier are determined based on the amount the combined phase shifted predicted filtered symbols exceed a threshold peak power value. The input symbols are adjusted using the peak reduction adjustment values.

A number of various features and different embodiments may also be provided for this aspect of the invention. For example, the act of adjusting the input symbols may comprise adding peak reduction adjustment values to input symbols for each carrier. Alternatively, the peak reduction adjustment values may comprise peak reduction adjustment gain values and the act of adjusting the input symbols may comprise multiplying input symbols for each carrier by the peak reduction adjustment gain values. The act of determining peak reduction adjustment values may comprise determining a single peak reduction adjustment value and phase shifting the peak reduction adjustment value by a separate amount for each carrier to create plural peak reduction adjustment values. The act of determining peak reduction adjustment values may further comprise determining a weighting value for each carrier and weighting the plural peak reduction adjustment values by corresponding weighting values. The act of determining a weighting value for each carrier may comprise determining the instantaneous power of each carrier and the act of weighting the plural peak reduction adjustment values by corresponding weighting values may comprise multiplying the peak reduction adjustment values of each carrier by the instantaneous power of the carrier. The method for signal peak reduction in a multiple carrier communication system may further comprise repeating the acts of predicting, phase shifting, combining, determining and adjusting a plurality of times employing different filter coefficients. The plural repetitions of the acts of predicting, phase shifting, combining, determining and adjusting may be performed in series. Alternatively, the plural repetitions of the acts of predicting, phase shifting, combining, determining and adjusting may be performed in parallel.

The present invention thus provides peak power reduction of multi-carrier communication systems. By doing so, the complexity and cost of the digital-to-analog converters, analog, IF, FR and RF power amplifier circuits in such communication systems will be greatly reduced. Other features and advantages of the present invention will be appreciated by a review of the following detailed description of the invention.

DETAILED DESCRIPTION OF THE INVENTION

Figure 1:
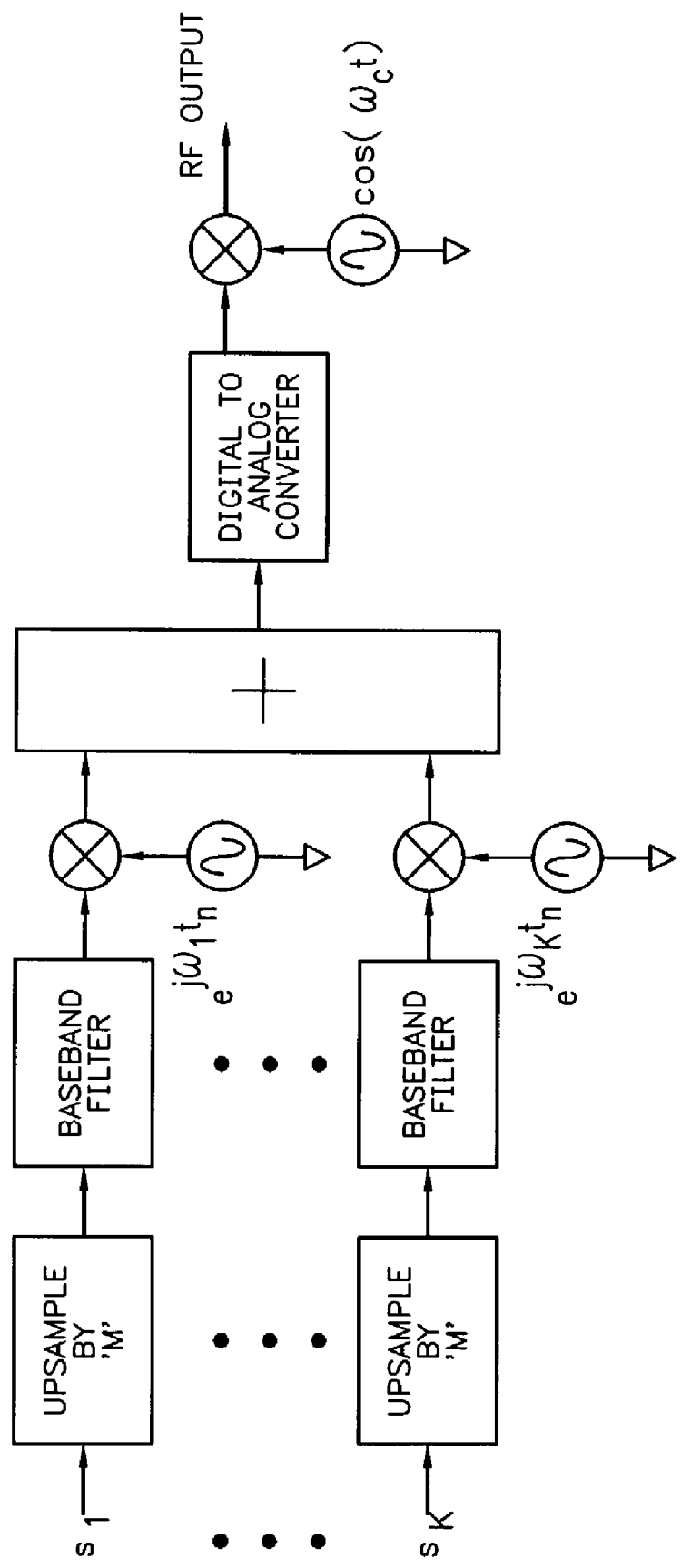
FIG. 1 is a block schematic drawing of a prior art multiple carrier communications system.
Figure 2:
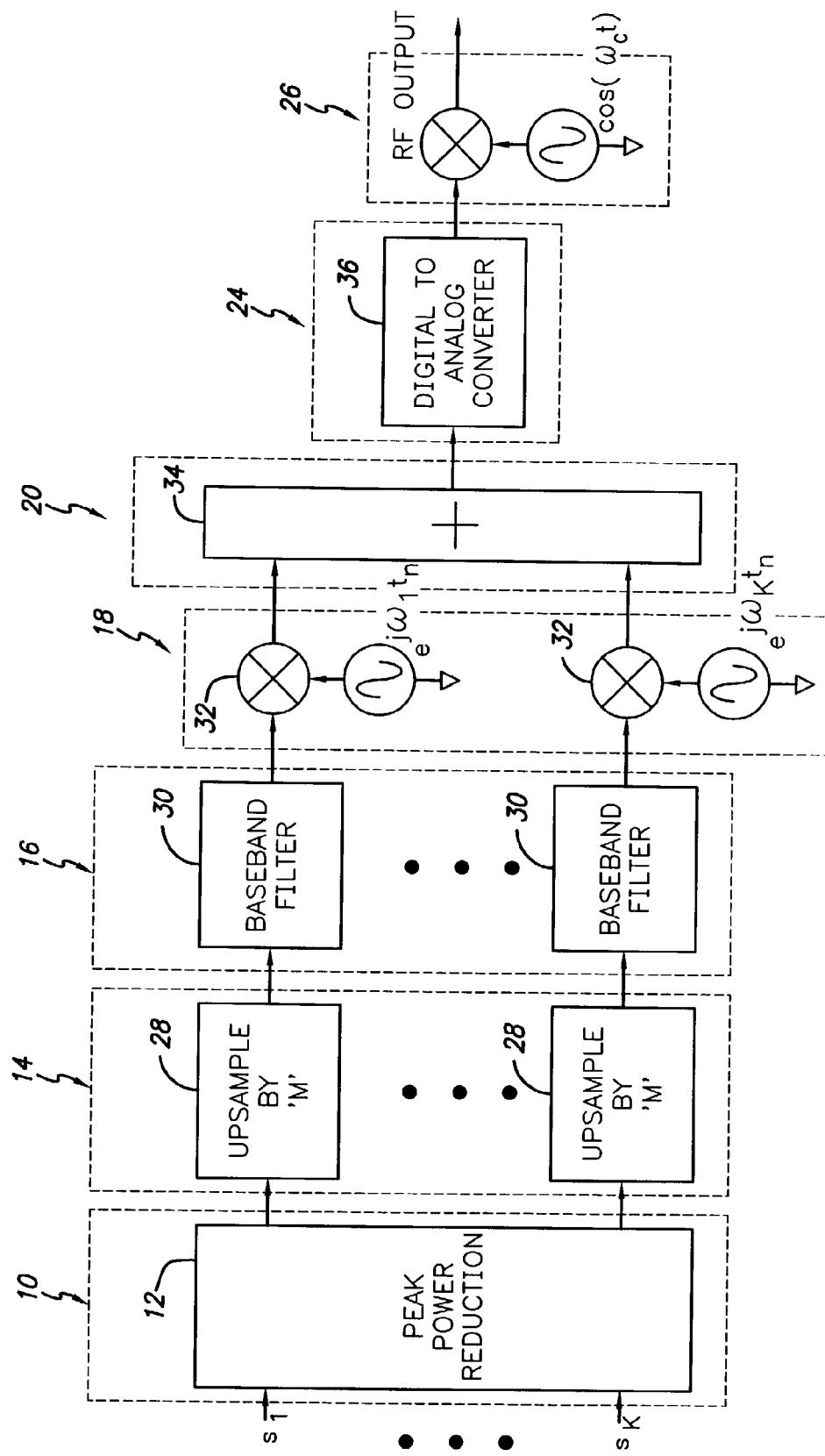
FIG. 2 is a block schematic drawing illustrating a multiple carrier communications system providing peak reduction in accordance with the present invention.

In FIG. 2 a preferred embodiment of a multiple carrier communication system employing peak power reduction in accordance with the present invention is illustrated. As used herein the term "multiple carrier" or "multi-carrier" refers to the use of two or more frequency offset carriers each of which may have one or more communications channels. For example, each carrier may have plural communication channels using time division multiplexing or code division multiplexing. Each carrier, whether alone or in combination with other carriers, can be used to communicate with one or more receiving stations. One example of such a multiple carrier communication system is a cellular communication system employing multiple frequency offset RF carriers, and multiple user channels may be provided for each carrier in WCDMA (Wide Code Division Multiple Access) or TDMA (Time Division Multiple Access) systems. Other multiple carrier communications systems may also employ the present invention. For example, various other well-known wireless communication systems, such as personal communication systems (PCS), wireless local loop systems and all other like systems, may advantageously employ the present invention.

Referring to FIG. 2, a plurality of separate carrier signal sources, each providing symbols corresponding to one or more data channels, provide the individual carrier symbols $s_k$, corresponding to the K individual carriers, as inputs to the multiple carrier communication system. The number of carriers K, and hence the range of the index k in FIG. 2 and subsequent figures, will vary with the particular application and may range from two to four for current WCDMA, two to forty for current TDMA communications systems, or several hundred or more (e.g., for OFDM communications systems). These carrier symbols $s_k$ are generally complex valued data points that represent one or more information data bits to be transmitted. The input symbols $s_k$ for each of the individual carriers are provided to peak power reduction stage 10. The input symbols for each of the individual carriers are processed together in the peak power reduction stage 10 to create a modified source of symbols $s_k'$ for the remaining multiple carrier signal generation stages. More specifically, these remaining multiple carrier signal generation stages include an upsampling stage 14, a filtering stage 16, a frequency offset stage 18 and a combining stage 20. The modified symbols $s_k'$ correspond to peak reduced symbols which will reduce or eliminate undesired peaks in the multiple carrier signal after signal combination at the combining stage 20. The peak reduced symbols $s_k'$ for each carrier are thus based on the effect of the other carriers. The effect of the filtering stage 16 is also preferably taken into account in creating the peak reduced symbols $s_k'$ for each carrier. The peak reduction processing is implemented in a peak power reduction unit 12, which may be a suitably programmed DSP, a hardware circuit such as an ASIC, or a combination of hardware and software. The operation of the peak power reduction unit 12 to provide these modified symbols $s_k'$ so as to achieve the desired peak power reduction will be discussed in detail below in relation to several preferred embodiments. After the combining stage 20 the multi-carrier signal is provided to a digital-to-analog conversion stage 24 and an RF generation stage 26 which provides an RF multi-carrier output signal.

Those skilled in the art will appreciate that there are many alternate embodiments of the multiple carrier signal generation stages shown which will produce substantially the same result. The present invention will work equally well with all alternate embodiments of the stages following the peak power reduction stage 12 shown in FIG. 2. These remaining stages of FIG. 2 will be briefly described so that the interaction of the peak power reduction unit with these subsequent stages in various alternate embodiments of these stages can be better understood.

Referring again to FIG. 2, after the symbols for each individual carrier are modified in the peak power reduction unit 12, each carrier path is upsampled to a higher data rate. This is accomplished by K upsampling circuits 28 which insert zero valued samples between peak reduced symbols at evenly spaced time intervals creating a symbol stream sampled at M times the symbol rate. If the symbol rate in each path is upsampled by M, M−1 zero valued samples are inserted between the peak reduced symbols. This upsampling increases the bandwidth of the symbol stream thus providing spectrum for the stop bands of the following filter. After upsampling to a higher sample rate, each upsampled symbol stream for each carrier is passed through baseband filters 30 to limit individual carrier transmission bandwidths, creating the individual carrier baseband signals. Next, the baseband signals are offset to different frequencies at mixers 32 which receive an offset frequency $\omega_k$ for each carrier k. The frequency offset signals are then combined at combiner 20 to create a digital representation of the desired multiple carrier output signal. Finally the digital multiple carrier signal is digital-to-analog converted and frequency up-converted to the desired frequency band of operation. The last two stages, digital-to-analog conversion 24 and frequency up-conversion 26, are performed with an in-phase and quadrature digital-to-analog converter and a quadrature RF upconverter if the final stages remain as complex values (not specifically shown but implied as an alternative in FIG. 2). If the final stages are converted to real values at some point before digital-to-analog conversion, these final two stages can be constructed with a single digital-to-analog converter 36, a mixer 38, and a local oscillator 40 (as shown in FIG. 2).

The amount of upsampling provided to the individual carrier symbol streams is determined by the bandwidth requirements of the resulting combined multiple carrier signal. The combined multiple carrier signal bandwidth is determined by the bandwidth of the individual carriers, the frequency separation of the individual carriers, and bandwidth required to prevent spectrum aliasing during analog signal generation. Normally the upsampling rate is kept to a minimum to reduce computational load. In this detailed description of the invention an example upsampling rate of M=10 will be used. This invention will work equally well at other upsampling rates based on systems requirements and standard digital signal processing theory known to those skilled in the art.

In most multiple carrier systems the baseband filters in each individual carrier generation path will use an identical baseband filter. This simplification will be made in the majority of this description of the invention. The present invention may also employ different filters in each carrier generation path and a discussion of the modification necessary to implement different baseband filters in each carrier path will be provided below in relation to FIGS. 30–32.

Figure 3:
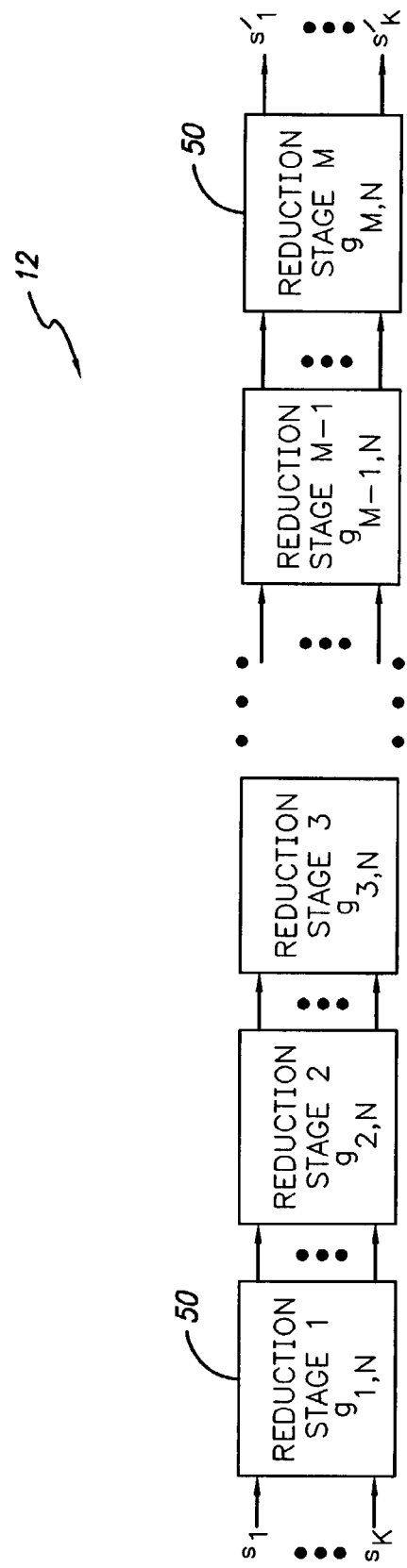
FIG. 3 is a block schematic drawing illustrating multiplex carrier peak reduction processing performed with series implemented process steps.
Figure 9:
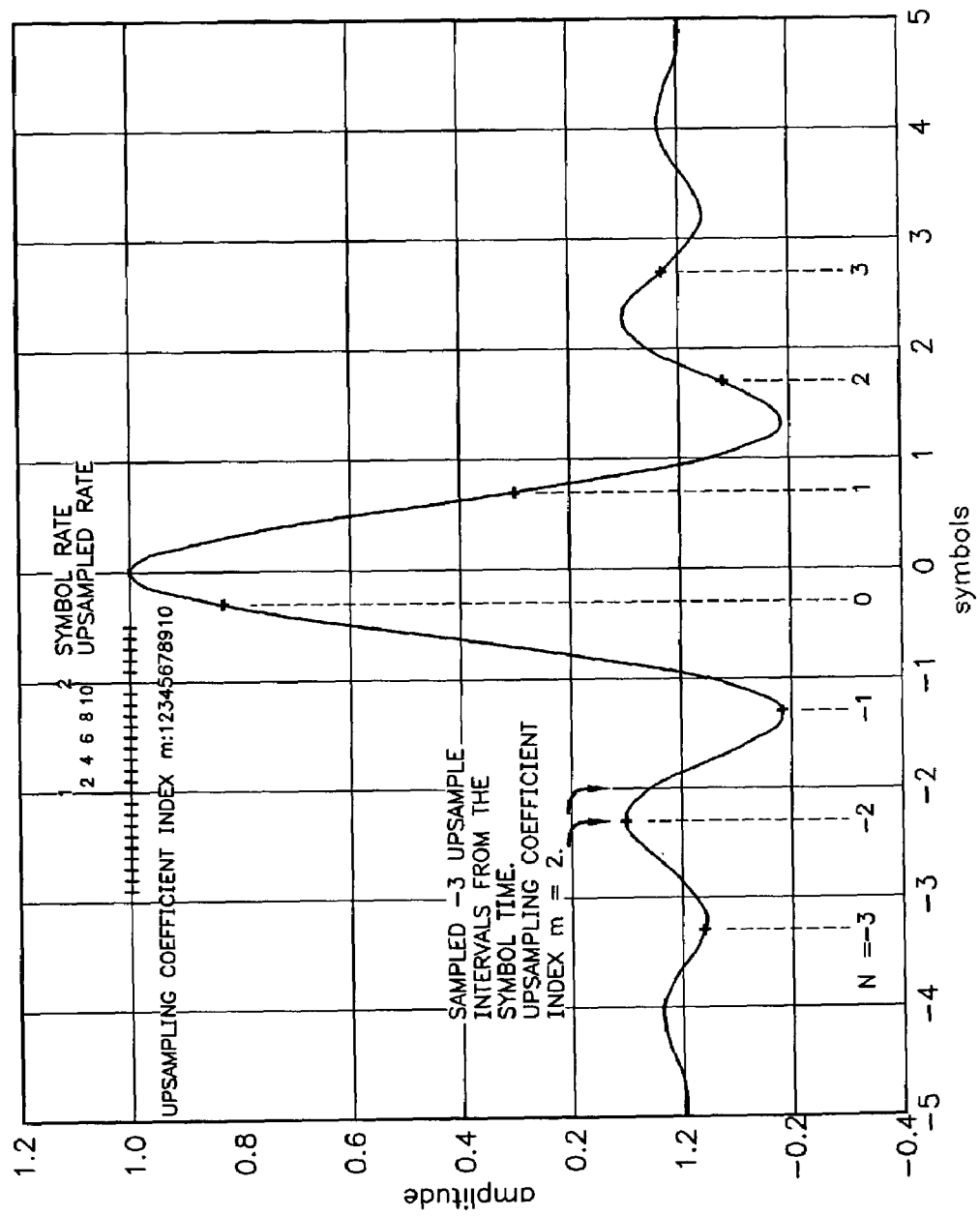
FIG. 9 shows the impulse response function of the baseband filter used to generate each carrier in the multiple carrier communication system. The figure shows an example of how sample coefficients are taken at a periodic rate equal to the symbol rate but offset in time by an integer multiple of the upsampled rate.

Referring to FIG. 3, an embodiment of the peak power reduction unit 12 of FIG. 2 showing M serially implemented reduction processing stages 50 is displayed. The processing performed in each stage 50 is identical with the exception of filter coefficients that are taken from the impulse response functions of the filters in the individual carrier processing paths. These coefficients are sampled from the impulse response function of the baseband filter 28 at the upsampled time interval as shown in FIG. 9. FIG. 9 shows an example where the upsampling variable M as given in FIG. 2 is set to 10. Each serial block shown in FIG. 3 includes gain coefficients reference by the function $g_{m,N}$, where m is the upsampling coefficient index given and N is a range of integer values each of which indicates a coefficient taken as shown in FIG. 9. The number of coefficients taken in the FIG. 9 example is seven. This number of coefficients could be larger or smaller depending on the peak reduction processing accuracy required and the memory and processing capabilities of the processing circuits used. Also, FIG. 3 shows each peak reduction process arranged using a specific order of coefficients in FIG. 9. The order of the coefficients may be altered and an optimal order may exist for peak reduction for a particular application. Such optimal order may be readily determined by testing peak reduction accuracy at different choices of ordering. In addition, any or all stages may be repeated to account for peak reduction errors caused by the causal nature of peak reduction processing. Also, the specific impulse response function of the baseband filter shown in FIG. 9 is purely illustrative and different specific filter impulse response functions may be employed. Also, while a FIR (Finite Impulse Response) filter impulse response function is illustrated, filter predictor coefficients may also be sampled from an impulse response function produced by an IIR (Infinite Impulse Response) filter.

Figure 4:
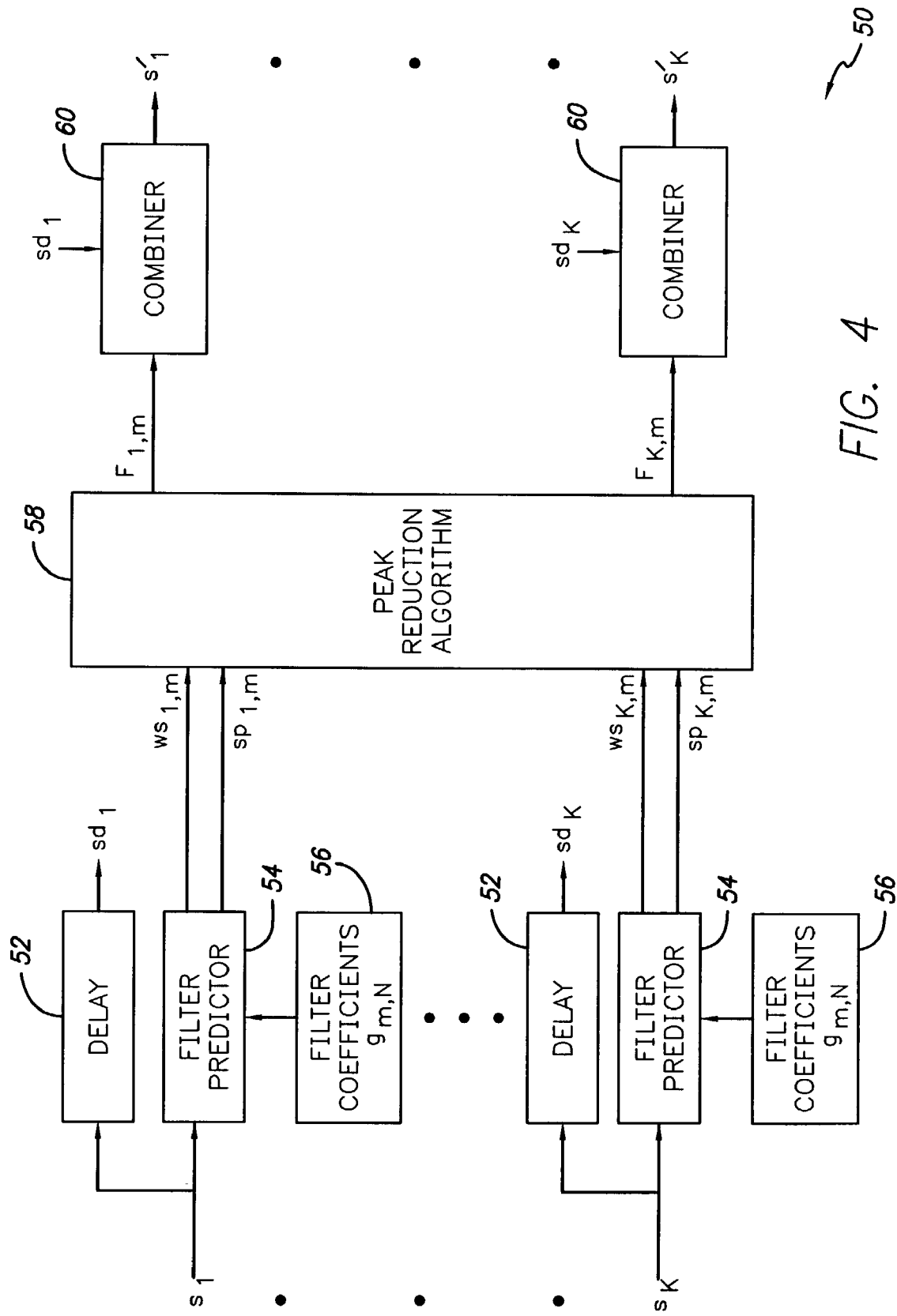
FIG. 4 is a block schematic drawing illustrating the processing performed in each series implemented peak reduction processing stage.

Referring to FIG. 4, an embodiment of the peak reduction processing circuit in each serially implemented processing stage 50 is illustrated. Symbols from each carrier path, $s_k$, are divided into a delay path and a filter predictor path. The symbols in the delay path are provided to delay circuit 52 and delayed symbols sd are output. The symbols in the filter predictor path are provided to filter predictor 54. The filter predictor 54 calculates two output values, weighted symbols $ws_{k,m}$ and signal predict $sp_{k,m}$. The output signal $sp_{k,m}$, represents a prediction of the baseband filter output, sampled at the symbol rate but offset in time by the upsampling coefficient index, m. To make this prediction, the filter predictor 54 uses the sampled impulse response function coefficients. The source of these coefficients may take the form of a memory 56 storing the filter coefficients, e.g., the coefficients illustrated in FIG. 9 for the appropriate sample points of the impulse response function. Of course, as noted above, other filter implementations may have differing filter response functions and therefore different filter coefficients will be stored in the filter coefficients memory 56. The number of impulse response coefficient samples used in calculating the prediction determines the prediction accuracy. The other filter predictor output, $ws_{k,m}$, predicts the baseband filter output based on the center coefficient sample only.

These filter predictions $sp_{k,m}$ and $ws_{k,m}$ from each carrier are passed unto the peak reduction algorithm circuit block 58. Peak reduction algorithm circuit block 58 calculates adjustment values, $F_{k,m}$, that are combined with the delayed input symbols provided from delay circuit 52 at combiners 60 to create the adjusted output symbols, $s40_{k,d}$. The combiner 60 used can be either an adder or multiplier based on whether the adjustments calculated are additive or multiplicative, respectively. Weighted symbols $ws_{k,m}$ are not necessary in all embodiments, depending on the algorithm used, as will be appreciated from the following specific embodiments.

Figure 5:
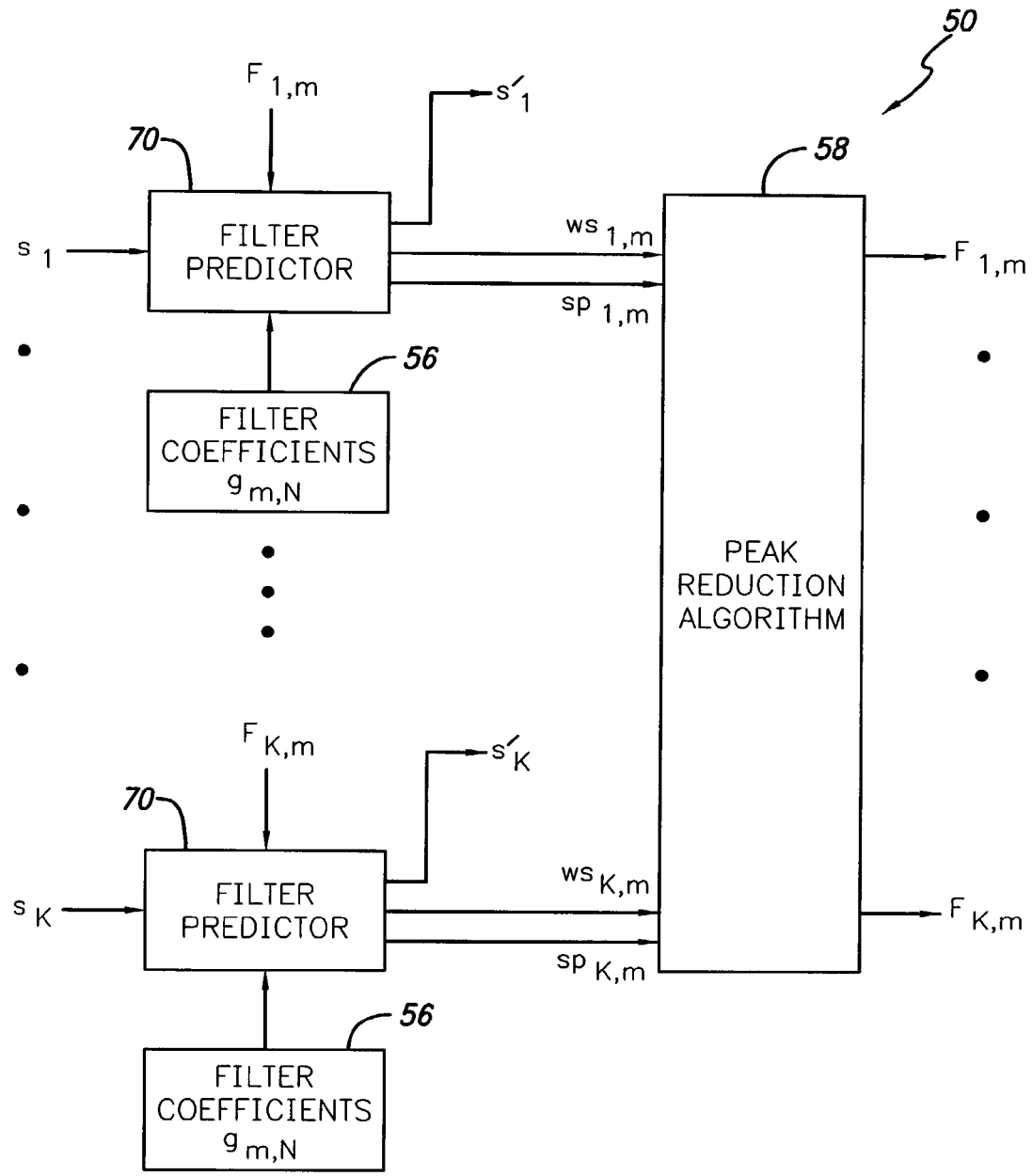
FIG. 5 is a block schematic drawing illustrating alternate processing performed in each series implemented peak reduction process stage. This alternative embodiment includes feedback to improve processing accuracy.

Referring to FIG. 5, an alternate embodiment of the processing performed in each serially implemented processing block 50 is given. Symbols from each carrier path enter a filter predictor 70. The filter predictor 70 calculates two output values, weighted symbols $ws_{k,m}$, and signal predict $sp_{k,m}$. These output signals are identical to those described above for FIG. 4. The filter predictions for each carrier are once again passed into the peak reduction algorithm block 58. As before the algorithm processor block 58 calculates adjustment values, $F_{k,m}$, for the individual symbol paths. In this alternate embodiment, however, the adjustment values are fed back to the filter predictor 70. The filter predictor 70 combines the adjustments internally so that adjusted symbol values can be used in calculating all predictions that follow the symbol adjustment. In this alternate embodiment, the filter predictor also outputs the adjusted symbol values $s'_{k,d}$. By providing feedback, this alternate embodiment improves the accuracy of symbol adjustments with a slight increase in processing and or circuit complexity.

Figure 6:
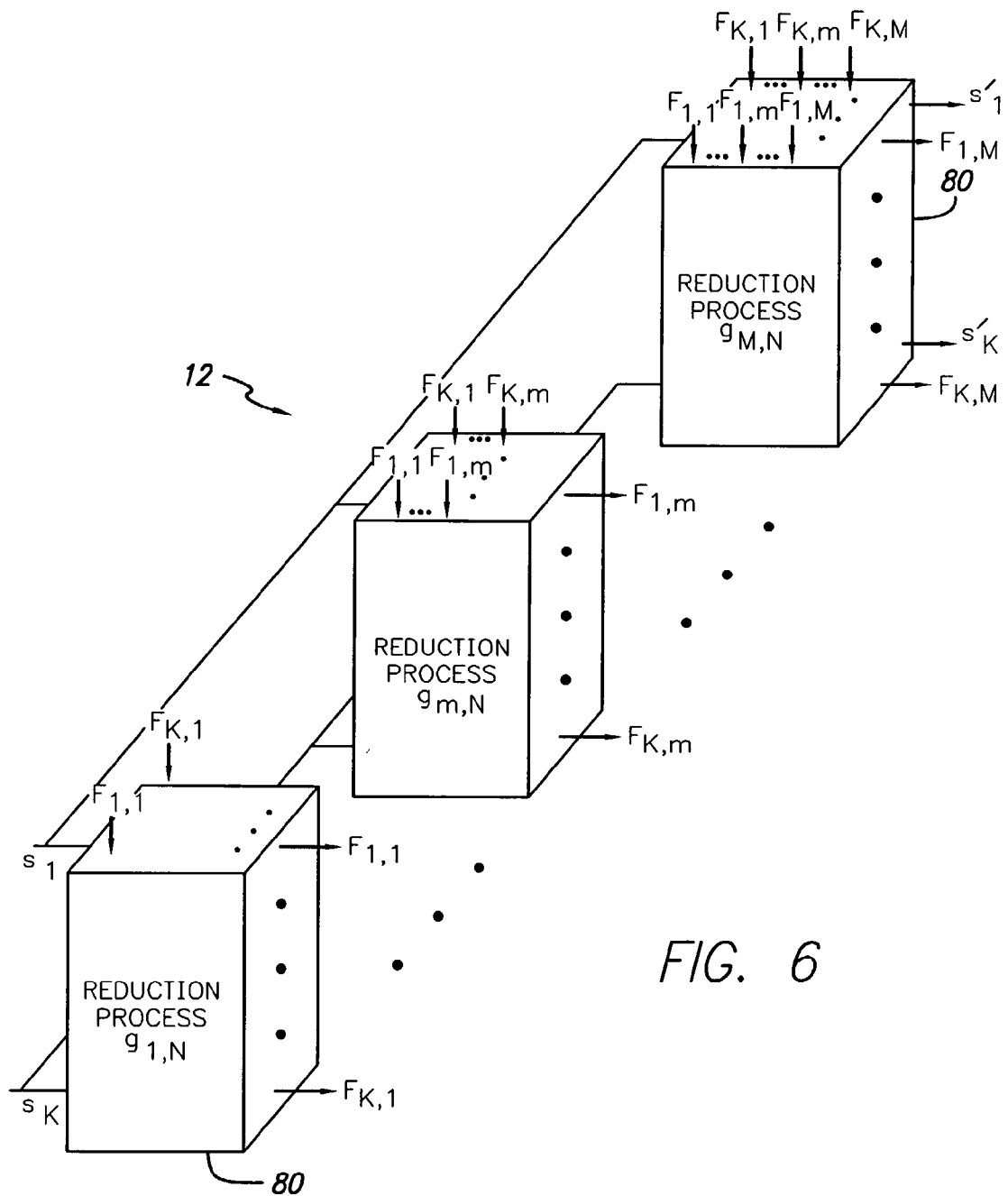
FIG. 6 shows a block schematic drawing illustrating multiple carrier peak reduction processing performed in parallel implemented processing stages.

Referring to FIG. 6, an embodiment of the peak power reduction unit 12 shown in FIG. 2, employing parallel peak reduction processing is illustrated. As in the serial implementation with feedback in FIG. 5, each parallel peak reduction stage 80 calculates feedback adjustments, $F_{k,m}$, based on coefficients sampled from the individual carrier baseband filter impulse response function, for example, as defined in FIG. 9. In the parallel embodiment of FIG. 6, however, the feedback adjustments, $F_{k,m}$ are provided in parallel to plural reduction processing stages. More specifically, in the first parallel stage 80, the stage using the coefficients sampled at coefficient sampling index m=1, the feedback adjustments in that stage are fed back to the same stage and to peak reduction stages using higher coefficient indices. The same is true for the stage using coefficient sampling index m=2 through M and all other stages. Only the stage using coefficient sampling index m=M receives feedback from all other parallel processes. Fully adjusted output symbols $s'_k$ are then output from the processing stage with the coefficient sampling index set to m=M, as illustrated in FIG. 6. This parallel embodiment has a processing time advantage over the serial embodiment of FIG. 3 since computations can be performed in parallel. This processing time advantage is paid for with increased processing algorithm and or processing circuit complexity.

Figure 7:
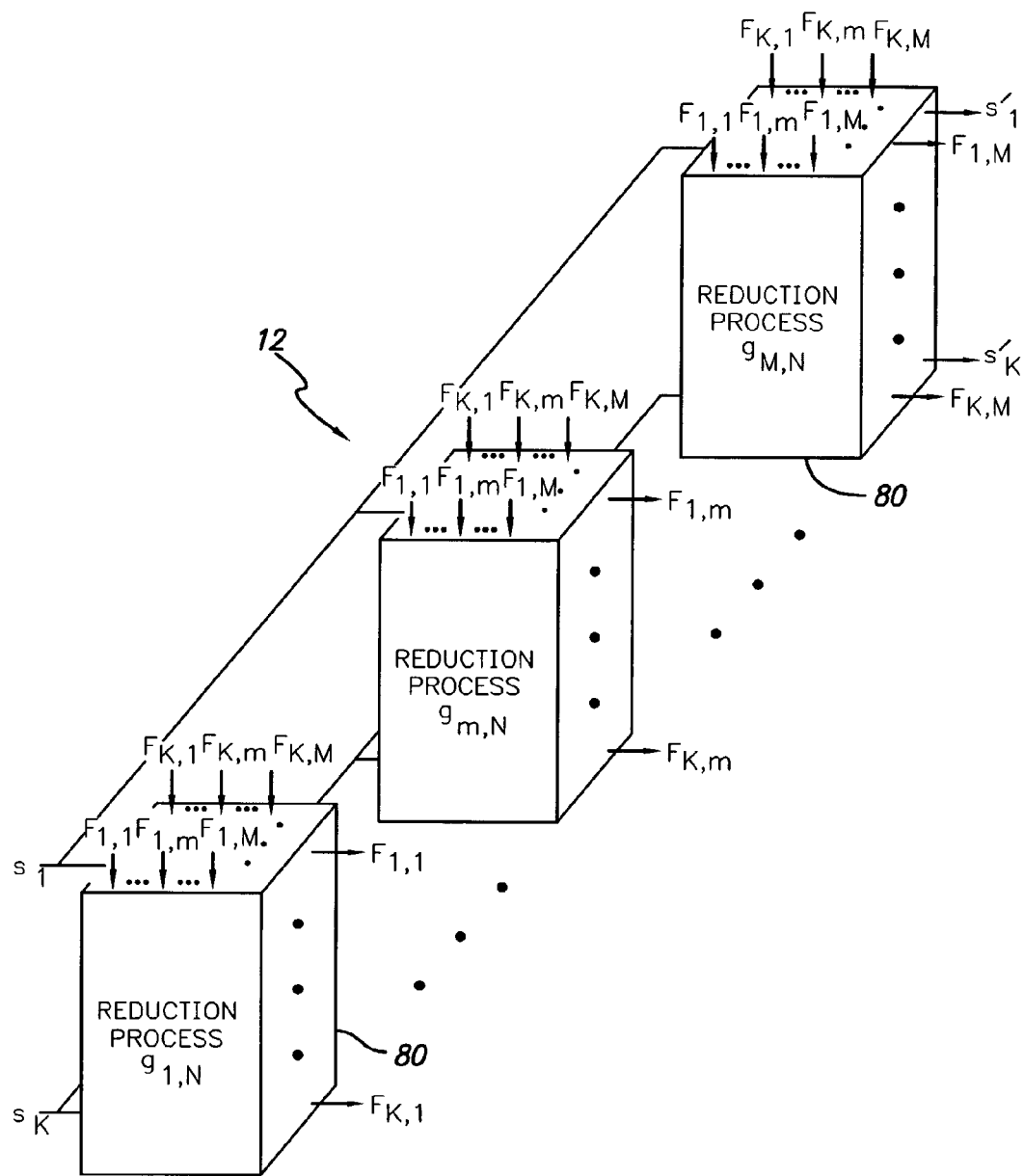
FIG. 7 shows a block schematic drawing illustrating multiple carrier peak reduction processing performed in alternative parallel implemented processing stages. In this alternative embodiment, additional feedback paths are utilized to improve processing accuracy.

Referring to FIG. 7, an alternate embodiment employing parallel peak reduction processing is illustrated. This implementation differs from FIG. 6 by providing feedback from all parallel peak reduction processing stages 80 to all other peak reduction processing stages regardless of the upsampling coefficient index. The advantage of this additional feedback is improved symbol adjustment. The cost of this additional feedback is increased processing algorithm and or processing circuit complexity.

Referring to FIGS. 6 and 7, the coefficient sampling index is shown to increase from m=1 to m=M for the parallel reduction processes. This order may be modified to start at a higher index and then stop at one minus that higher starting index. For example the coefficient sampling index may start at M=3 and proceed to M and then followed by m=1, and 2 (m=3, 4, . . . , M, 1, 2). By changing this order peak reduction may be optimized for a particular application. Such optimal ordering may be readily determined by testing peak reduction accuracy at different choices of ordering. In addition, any or all parallel reduction stages may be repeated to account for peak reduction errors caused by the causal nature of peak reduction processing.

Figure 8:
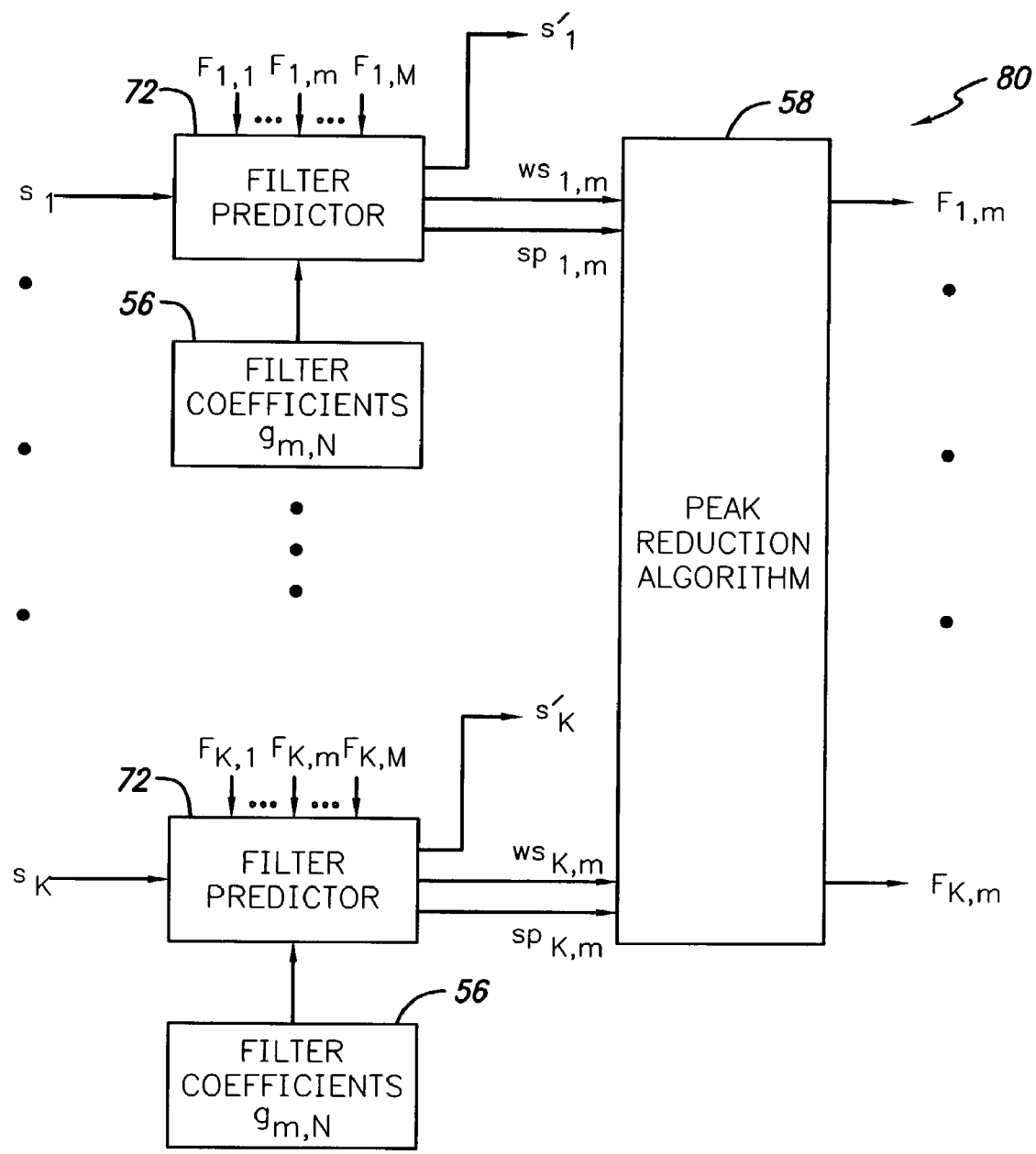
FIG. 8 shows a block schematic drawing illustrating the processing performed in each parallel implemented peak reduction processing stage.

Referring to FIG. 8, an embodiment of the parallel peak reduction processing stages 80 is given for the parallel processing embodiments illustrated in FIG. 6 and FIG. 7. FIG. 8 differs from FIG. 5 in that feedback adjustments, $F_{k,m}$, to the filter predictor 72 come not only from the peak reduction algorithm included in the figure, but from all other parallel implemented peak reduction stages 80 shown in FIG. 6 or FIG. 7. In the case of FIG. 6, only the feedback lines from stages using filter coefficients from the current upsampled coefficient index or lower are used. In the case of FIG. 6, feedback lines from higher upsampled coefficient indices than the current stage can be removed. All other aspects of this parallel implemented process are the same as described for FIG. 5 and accordingly like numerals are employed and the description thereof incorporated by reference.

Figure 10:
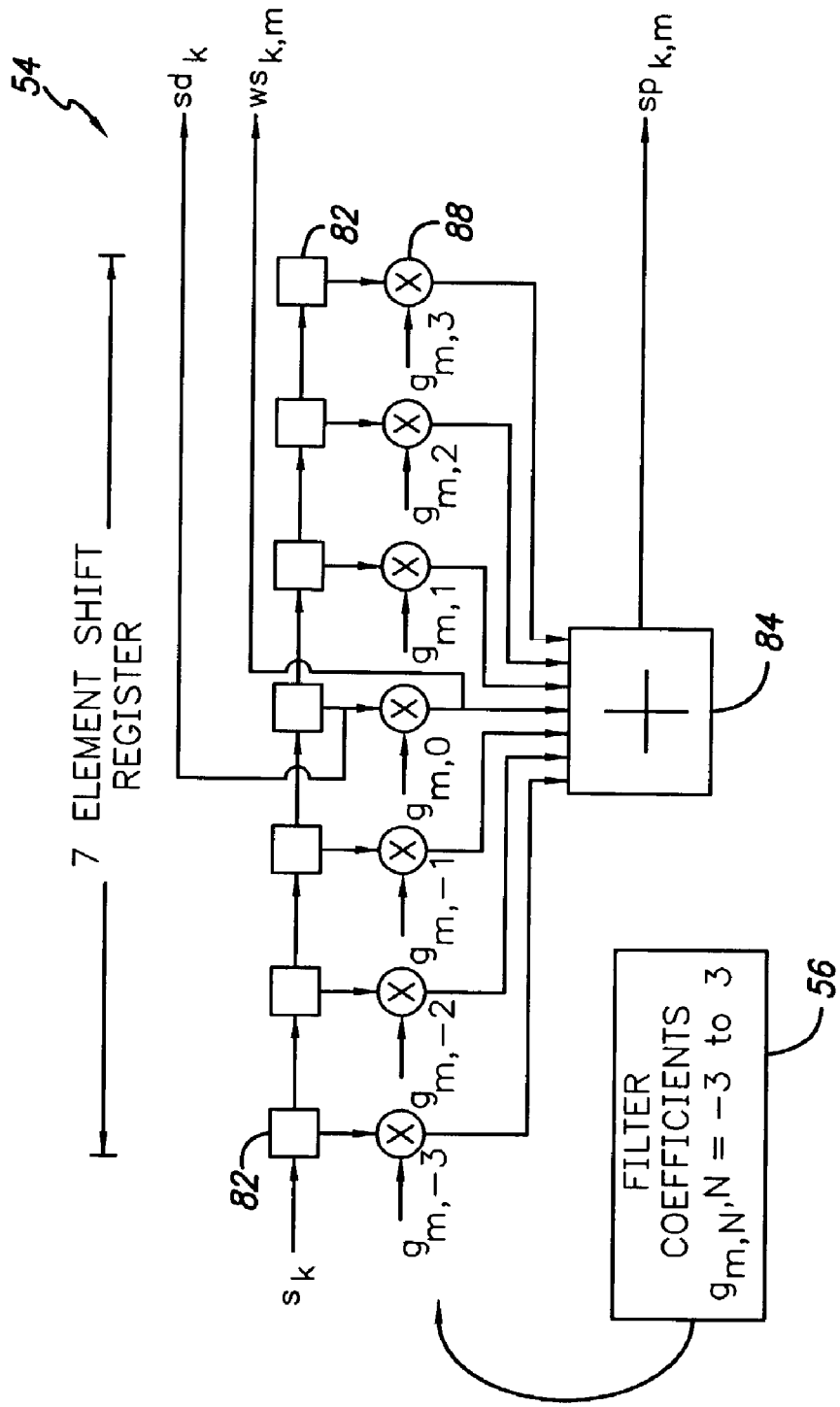
FIG. 10 is a block schematic drawing of an example of a filter predictor used in the serial peak reduction embodiment shown in FIG. 4. This example filter predictor uses impulse response coefficients sampled from the impulse response function as shown in FIG. 9.

Referring to FIG. 10, an embodiment of the filter predictor 54 employed in the embodiment of FIG. 4 is shown. This illustrated filter predictor uses seven impulse response coefficients sampled from the impulse response function as shown in FIG. 9. The choice of seven impulse response coefficients is purely an example and greater or fewer coefficients may be chosen. Also, the specific impulse response function of FIG. 9 may also vary with the particular filter, as discussed above. The output, signal predict $sp_{k,m}$, is calculated using a finite impulse response filter as illustrated in the block schematic diagram. More specifically, input symbols. $s_k$ are shifted through a shift register, comprising memory registers 82, at the symbol rate. In the illustrated example of seven registers, the registers 82 thus collectively form a seven element shift register. At the symbol rate each memory register 82 is multiplied by the filter coefficient gains provided from memory 56 to respective multipliers 88 and, the resulting gain multiplied values are summed at summer 84 to produce the predicted signal value, signal predict $sp_{k,m}$, as shown in FIG. 10. As further shown in FIG. 10, the filter predictor 54 has other output taps. One of these taps provides the delayed symbol output, symbol $sd_k$, that can be used as an alternative to the delay path shown in FIG. 4. The filter predictor 54 also provides the output, weighted symbol $ws_{k,m}$, used in calculating symbol corrections in the peak reduction algorithm block shown in FIG. 4.

Figure 11:
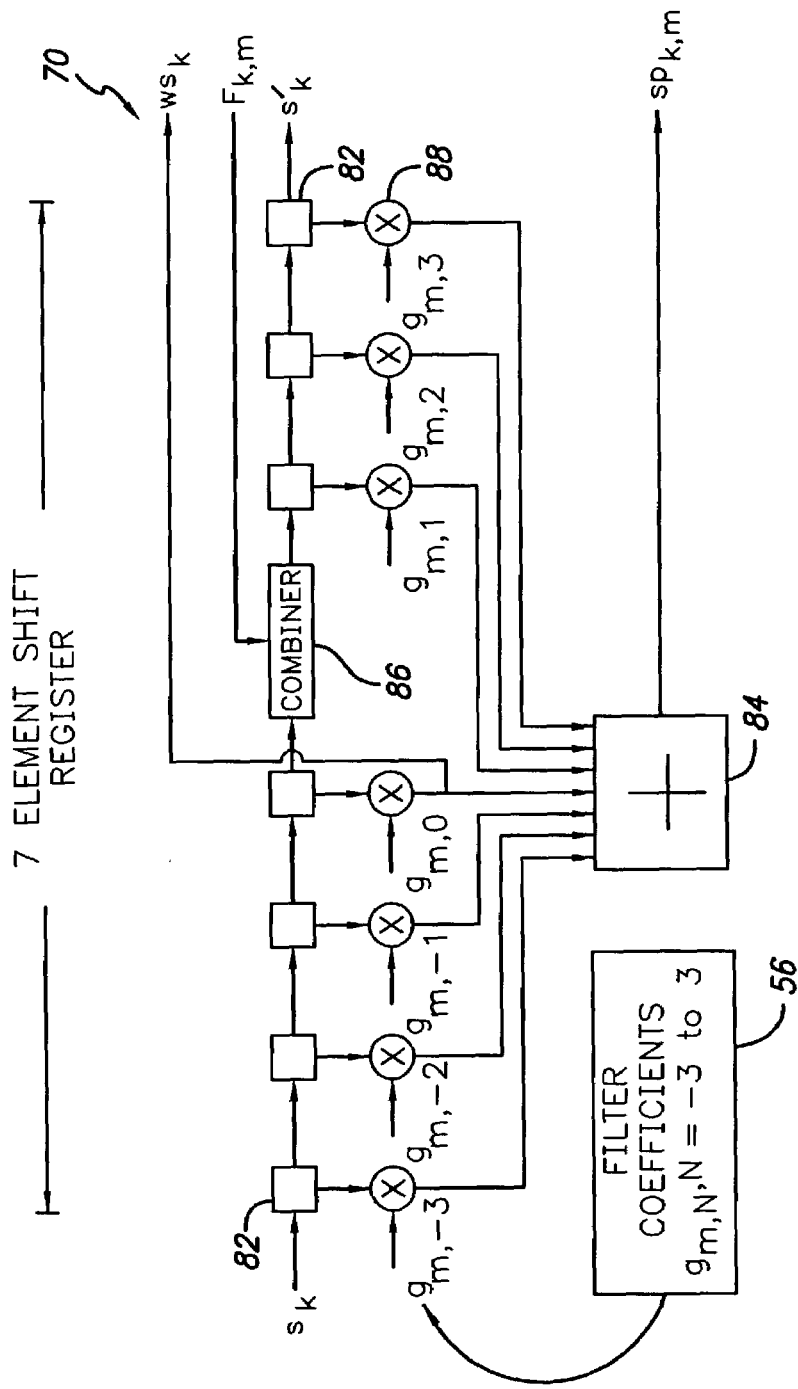
FIG. 11 is a block schematic drawing of an example filter predictor used in the serial peak reduction embodiment shown in FIG. 5. This example filter predictor uses impulse response coefficients sampled from the impulse response function as shown in FIG. 9.

Referring to FIG. 11, an embodiment of the filter predictor used in FIG. 5 is shown. This filter predictor operates in a similar manner to the filter predictor of FIG. 10 and like numerals are employed for common elements. As in the case of FIG. 10, the illustrated filter predictor 70 uses seven impulse response coefficients sampled from the impulse response function as shown in FIG. 9. The output, signal predict $sp_{k,m}$, is similarly calculated using a finite impulse response filter as illustrated in the block schematic diagram. More specifically, input symbols $s_k$ are shifted through memory registers 82 at the symbol rate. At the symbol rate each memory register 82 is multiplied by the filter coefficient gains by multipliers 88 and the resulting gain multiplied values are summed at summer 84 to produce the predicted signal value, signal predict $sp_{k,m}$, as shown in FIG. 11. This predicted signal calculation however differs from that of FIG. 10 in that input symbols are adjusted by feedback. As discussed in relation to FIG. 5, this feedback is calculated from the peak reduction algorithm that processes predicted filter outputs from all carrier paths. The combiner 86 shown in FIG. 11 receives the feedback and inserts the feedback values into the shift register. Combiner 86 can be either an adder or multiplier based on whether feedback adjustment is additive or multiplicative, respectively. As in the case of FIG. 10, this filter predictor 70 also provides the output weighted symbols $ws_{k,m}$ used in calculating symbol corrections in the peak reduction algorithm block 58 shown in FIG. 5.

Figure 12:
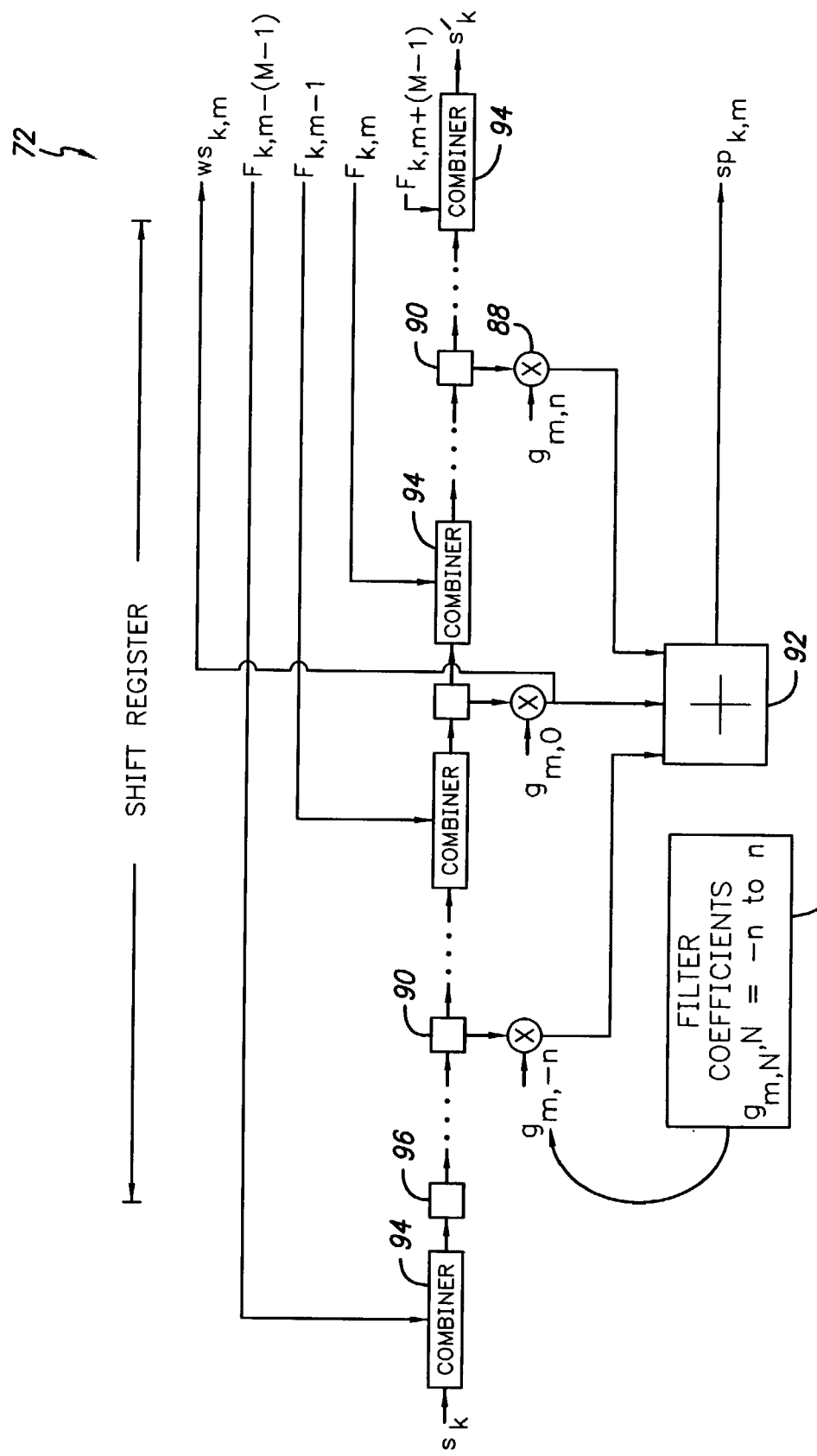
FIG. 12 is a block schematic drawing of an example filter predictor used in the parallel peak reduction process shown in FIG. 8. This example filter predictor uses impulse response coefficients sampled from the impulse response function as shown in FIG. 9.

Referring to FIG. 12, an embodiment of the filter predictor 72 used in FIG. 8 is shown. As in the previous embodiments, this filter predictor 72 uses impulse response coefficients sampled from the impulse response function as shown in FIG. 9. The range of index n in FIG. 12 indicates the number of the impulse response function coefficients used to create the baseband filter prediction. (For comparison, the previous embodiments illustrated n=3, or seven samples of the impulse response function.) Similarly to previous embodiments, the output, signal predict $sp_{k,m}$, is calculated using a finite impulse response filter as illustrated in the block schematic diagram. Input symbols are shifted through memory registers 90, at the symbol rate. At the symbol rate each memory register 90 is multiplied by the filter coefficient gains provided from memory 56 to respective multipliers 88. The outputs of multipliers 88 are summed at summer 92 to produce the predicted signal value, signal predict $sp_{k,m}$. Feedback is provided to the filter predictor and feedback values are inserted into the shift register at combiners 94. The predicted signal calculation differs from that of FIG. 10 and FIG. 11 in that input symbols are adjusted by feedback from several sources. Also, the number of memory registers is expanded by adding extra registers 94 to accommodate feedback lines from other filter predictors operating with a different upsampling coefficient index. The figure shows 2*M−1 possible feedback lines. Both FIG. 6 and FIG. 7 in contrast show only M possible feedback lines for each parallel processed carrier filter predictor. The additional registers and feedback lines in FIG. 12 are provided so that feedback lines can be properly time aligned with shift register memory positions. The range of the index m in FIG. 12 is from 1 to M. Feedback is only provided for feedback variables $F_{k,1}$ to $F_{k,M}$. For feedback variables outside this range the feedback lines in FIG. 12 may be ignored. More specifically, feedback adjustments do not exist for negative upsampling coefficient indices. In each particular application if the feedback line has a negative upsampling coefficient index, the feedback line and feedback combiner can be ignored (or physically removed if a hardware implementation is employed). The combiners 94 shown in FIG. 12 can be either an adder or multiplier based on whether the feedback adjustment is additive or multiplicative, respectively. Filter predictor 72 also provides the output, weighted symbols $ws_{k,m}$, used in calculating symbol corrections in the peak reduction algorithm block shown in FIG. 8.

The signal predict $sp_{k,m}$ output generated in the filter predictors of FIG. 10, FIG. 11, and FIG. 12 represents a symbol rate sampled prediction of the baseband filter output found in each carrier generation path. The predictive ability of this filter predictor output can be understood by viewing how the baseband filters 30 (shown in FIG. 2) found in the carrier generation paths operate. Assume for example, each baseband filter is constructed using a FIR filter structure. The FIR filter will use impulse response coefficients sampled from the impulse response function shown in FIG. 9 at every upsampled coefficient interval. As the filter processes the input upsampled symbols, each sample will be multiplied by a filter coefficient, and summed to produce a baseband filter response output. As noted above, however, most of the samples in the upsampled symbol stream are zero valued. At any given time therefore, the baseband filter output is determined by a subset of baseband filter coefficients. If the symbols are upsampled M times, M coefficient subsets will exist. As the upsampled symbols pass through the filter, the symbols themselves therefore select filter coefficients based on the upsampling coefficient index method shown in FIG. 9. (This natural subset selection characteristic produced when filtering upsampled signals permits baseband filter designs to be implemented with parallel processing if desired. Such filters are an alternate embodiment of the upsampling and filtering stages 14 and 16 described in FIG. 2, that will work equally well with the present invention.) Each signal predict $sp_{k,m}$ output from a filter predictor will match the a symbol rate sampled output of the baseband filter when the same upsampled coefficient indexed coefficients are used. To reduce computational load, however, the specific implementation may choose to reduce the number of index selected coefficients used in the filter predictor than are used by the baseband filter. In this regard it should be appreciated that the goal of the baseband filter is to limit the carrier bandwidth. The goal of the filter predictor is to estimate the amplitude and phase of the baseband filter output for peak reduction purposes. The filter predictor can therefore use a smaller set of coefficients and still produce good signal amplitude and phase estimates. When reducing the number of filter predictor coefficients, it is preferable to remove an equal number of coefficients from both the beginning and end of the coefficient set.

In the above description it was assumed that the baseband filters (16 of FIG. 2) were constructed as FIR (Finite Impulse Response) filters. These filters could alternatively be constructed as IIR (infinite Impulse Response) filters if desired. Coefficients used in the filter predictors would be selected as before from the impulse response function from the IIR filter as shown in FIG. 9. Since the filter predictor will only use a finite number of coefficients the prediction will not be exact. The predictions however will be accurate for peak reduction purposes.

Figure 13:
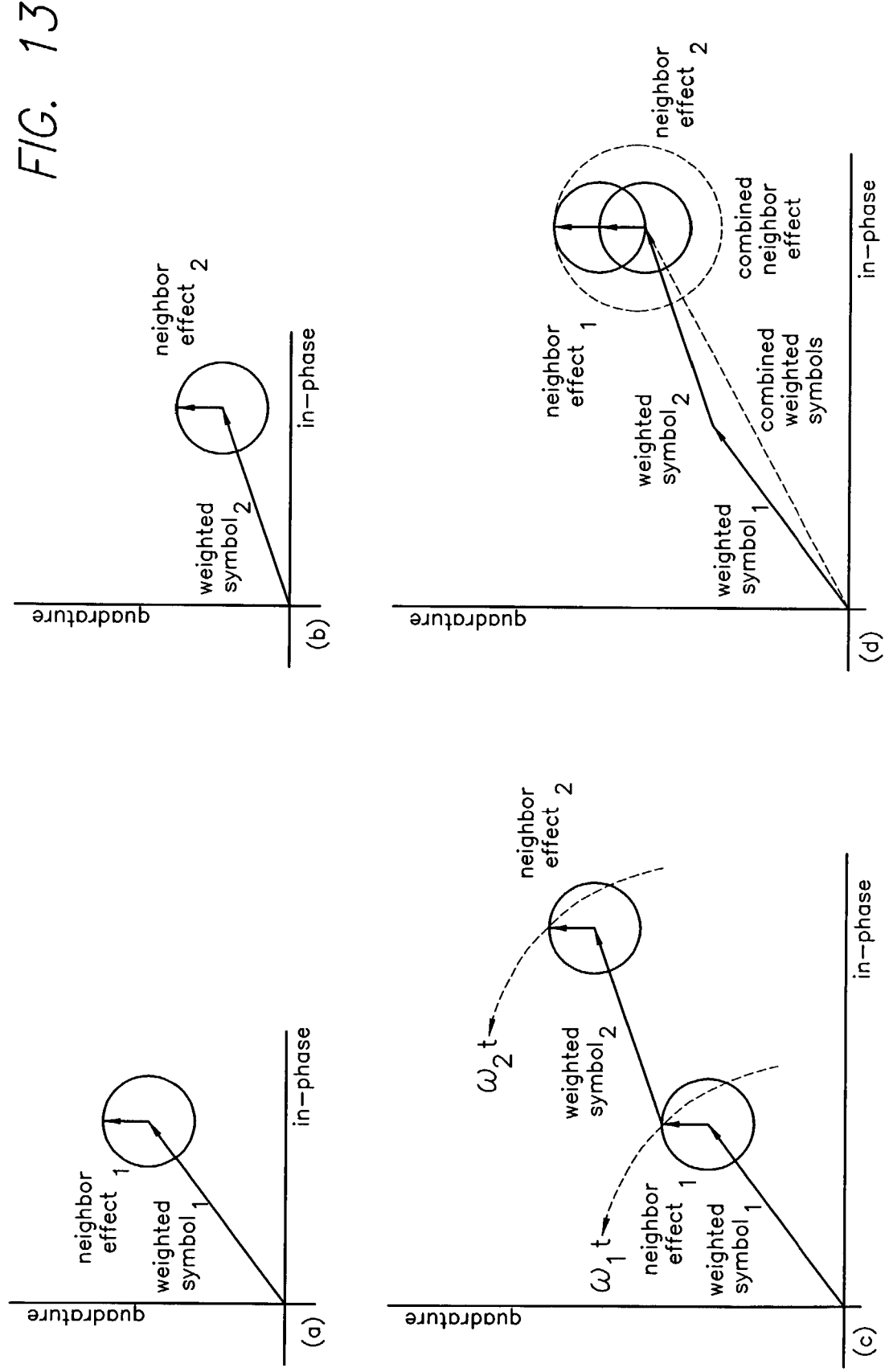
FIG. 13 is a complex vector diagram illustrating how individual carriers are constructed from input symbols and the baseband filter response. The figure also illustrates how these individual carriers are combined to create a multiple carrier signal.

To reduce peak power at the combined multiple carrier output, the present invention makes adjustments to the input symbols. To accomplish this symbol adjustment, an algorithm must be capable of associating output multiple carrier peaks to input individual carrier symbols and then adjusting those peak causing input individual carrier symbols to eliminate the source of the multiple carrier output peaks. Referring to FIG. 13 the preferred approach to developing these types of algorithms will be described.

FIG. 13(*a*) shows an instantaneous output of a single carrier baseband filter. This instantaneous output is broken into two parts, a weighted symbol part and a neighbor effect part. As discussed above, e.g., in relation to FIG. 10, it was established that the signal predict $sp_{k,m}$ output predicts the baseband filter output on a symbol rate sampled basis. Each instantaneous signal predict $sp_{k,m}$ output is determined as the sum of weighted input symbols. This signal predict $sp_{k,m}$ output could be considered as the sum of one weighted symbol combined with the sum of its neighboring weighted symbols as is shown in FIG. 13(*a*). In FIG. 10 the weighted symbol was selected as the center symbol of the FIR structure and has an output labeled weighted symbol, $ws_{k,m}$. The neighbor effect can be calculated as the difference between the output, signal predict $sp_{k,m}$, and the output, weighted symbol $ws_{k,m}$. FIG. 13(*b*) is identical to FIG. 13(*a*) except for representing a second carrier. The remaining portions of FIG. 13 will develop the combined multiple carrier output for a two carrier case. More carriers can be added by extension of the principals involved.

Referring to FIG. 13(*c*), carriers 1 and 2 are combined after frequency translation. The frequency translation of these two carriers will cause the outputs to rotate at $\omega_1 t$ and $\omega_2 t$ respectively. For simplicity in the figure, both these frequency related phase shifts were set at time instant t=0 or zero degrees phase rotation. Referring to FIG. 13(*d*) the components of FIG. 13(*c*) are rearranged and combined to produce the combined weighted symbols and the combined neighbor effect. By using this method, the instantaneous multiple carrier output signal can be defined as a function of multiple carrier input symbols at one time instant and multiple carrier input symbols which precede and follow, or neighbor, that time instant.

Figure 14:
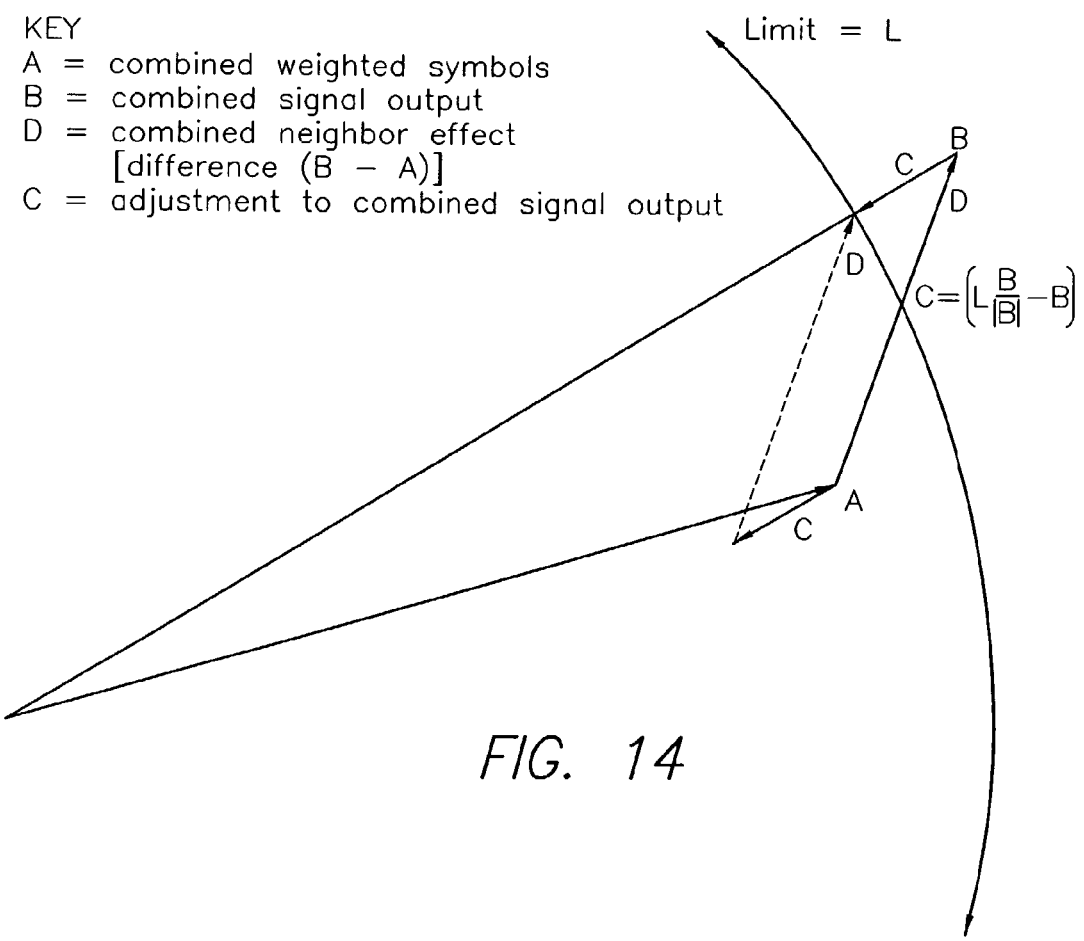
FIG. 14 illustrates the geometric development of a minimum amplitude error correction equation. This equation can be applied within a peak reduction algorithm to calculate peak reduction corrections to input symbols.

Referring to FIG. 14, a geometric illustration of the peak reduction process is given. FIG. 14 shows four signal vectors. Vector A represents the combined weighted symbols. Vector B represents the combined baseband filter output or the corresponding combined filter predictor output. Vector D represents the neighbor effect or the difference between vector A and vector B. Vector C shows the adjustment necessary to the combined filter output to set the combined filter output to a predetermined peak limit level, L. Since adjustments will be made to the combined weighted symbols, vector C is also shown translated down to vector A.

Applying basic vector algebra to the vectors illustrated in FIG. 14 results in Equation (1) below. Correction vector C when applied to the combined weighted symbol vector A will reduce the baseband filter output vector B to limit value L. With Equation (1) established, several different embodiments of peak reduction algorithm processors employed in peak reduction algorithm block 58 can be developed.

$$C = \left(L\frac{B}{|B|} - B\right) \qquad (1)$$

Figure 15:
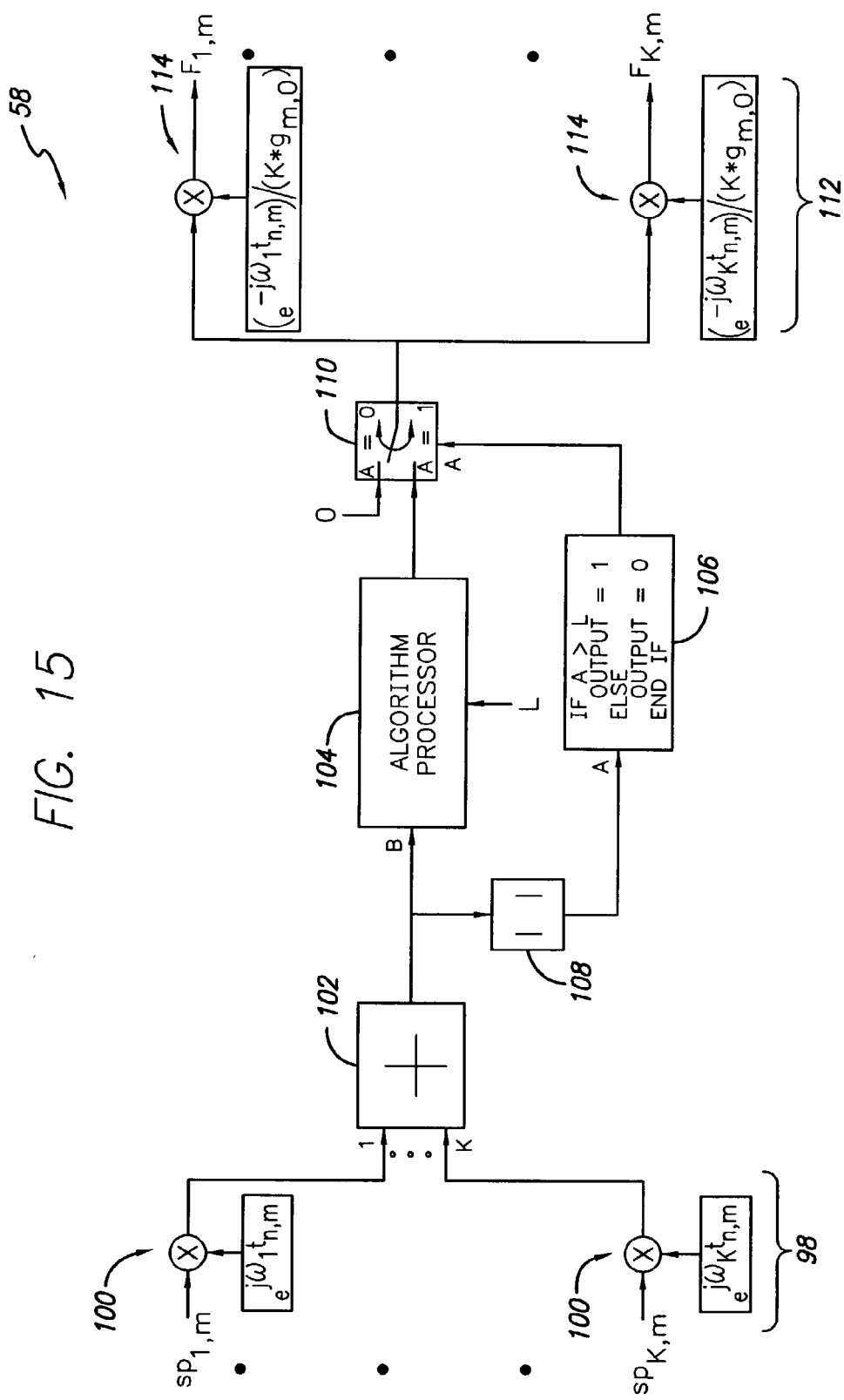
FIG. 15 is a block schematic drawing of one preferred embodiment of the peak reduction algorithm circuit block shown in FIG. 4, FIG. 5, and FIG. 8. This embodiment of the peak reduction algorithm circuit block calculates an additive correction vector that is distributed equally to peak causing symbols in each carrier.
Figure 16:
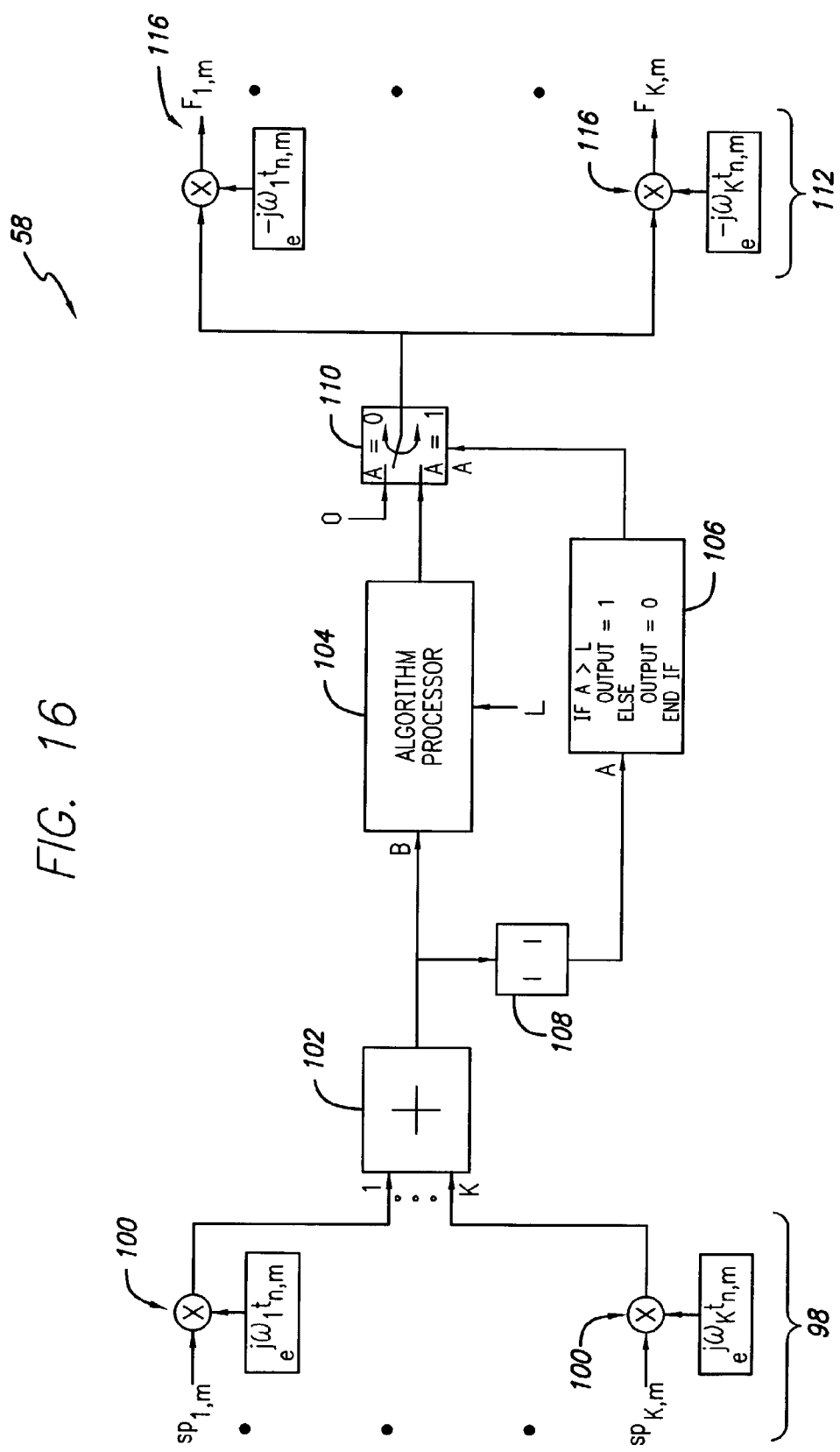
FIG. 16 is a block schematic drawing showing a simplified embodiment of the peak reduction algorithm circuit block of FIG. 15.

Referring to FIG. 15, an embodiment of peak reduction algorithm block 58 is illustrated. Peak reduction algorithm block 58 receives K inputs (signal predict $sp_{k,m}$) from the K carrier filter predictors, respectively. These inputs are provided to phase shift circuit 98 where each of these signals $sp_{k,m}$ is phase shifted in a manner corresponding to the frequency offset applied during multiple carrier combination. As discussed above, the signal predict inputs $sp_{k,m}$ represent predicted symbol rate samples of the baseband filter outputs. The phase adjustments applied must therefore also represent matching symbol rate samples of the frequency rotations applied during the respective carrier frequency offset. The K separate phase adjustments are applied by K phase shifters 100 which apply respective complex phase rotations of $\omega_k$ at the timing $t_{n,m}$. After phase shifting, the phase shifted predicted signal inputs are combined at summer 102 to produce a prediction of the combined multiple carrier output signal (i.e. vector B). This combined predicted output is provided to the algorithm processor 104 which also receives a predetermined limit level, L, and calculates a correction. For example, the processor may use Equation (1) to calculate a vector C that will place the combined multiple carrier output signal on the limit line L. The combined predicted output from summer 102 is also applied to a parallel path and provided to absolute value circuit 108. An absolute value of the combined predicted output from summer 102 (i.e., |B| using the nomenclature of equation (1) but denoted as A in FIG. 15) is then provided to comparator 106 which determines when the magnitude of the combined predicted output exceeds the limit level L. When the limit level is exceeded the switch 110 is enabled and the correction value from algorithm processor 104 is set to the switch output. When the limit level is not exceeded the switch 110 outputs a zero correction value. This correction value must be distributed to each of, the input symbol streams. Before this can be done however the effects of the symbol weighting and phase rotation must be removed. This is provided in symbol correction phase adjustment stage 112. Since the correction calculated will be applied to the symbol centered in the filter predictor the weighting coefficient $g_{m,0}$ is removed from each correction. The last stage 112 of FIG. 15 provides the removal of the filter weighting, carrier phase rotation, and equal correction signal distribution by dividing each correction path by the number of carriers K. These adjustments are provided by combined phase shifting and correction distribution circuits, 114. To reduce computational loading the constant factor $K^*g_{m,0}$ can be moved from the individual carrier correction branches and placed into the algorithm processor and FIG. 16 shows the simplified peak reduction algorithm block 58 employing simpler phase shifting circuits 116. Equation (2) shows a new algorithm processor equation suitable for use with in the simplified peak reduction algorithm block of FIG. 16. The correction provided by this algorithm processor is additive and should be used with additive combiners when incorporated in systems shown in FIG. 4, FIG. 11, and FIG. 12.

$$C = \left(L\frac{B}{|B|} - B\right)\frac{1}{(K*g_{m,0})} \qquad (2)$$

Using the peak reduction processes as described in relation to FIG. 15 and FIG. 16 produces excellent peak power reduction results for many applications. However, in some applications a problem with this method may arise since the correction is distributed evenly to all carriers whenever the multiple carrier signal peak power exceeds the limit level. Peaks in the output multiple carrier signal may be dominantly caused by just a few or even one carrier. In many multiple carrier systems individual carrier power levels may be dramatically different. Some carriers may even be turned off. By distributing the correction signal equally to all carriers, all carriers must also bear the burden of the signal distortion caused by the correction. Low power carriers may be overwhelmed by peak correction distortion and off channels may appear to be on.

Figure 17:
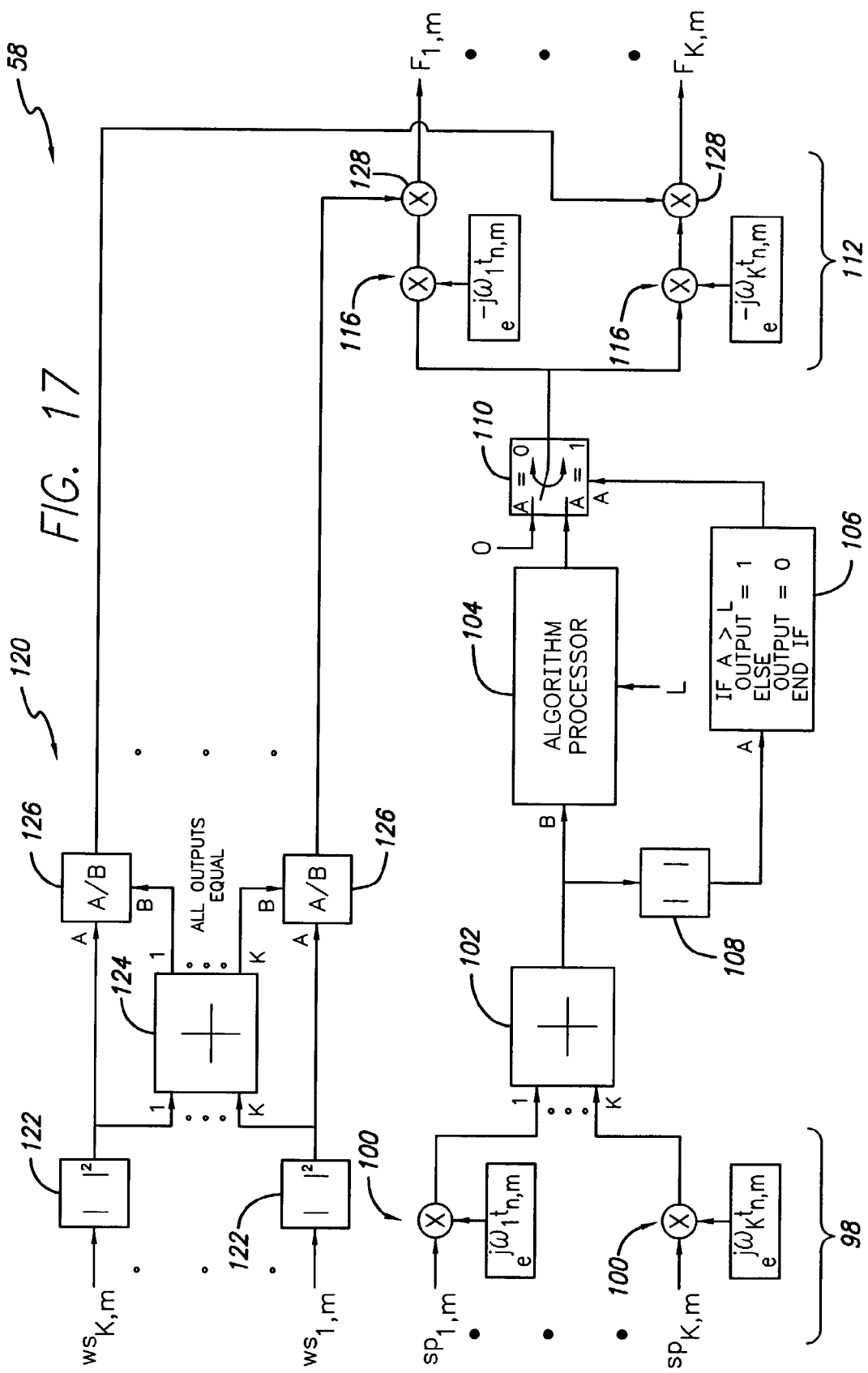
FIG. 17 is a block schematic drawing of an alternate embodiment of the peak reduction algorithm circuit block shown in FIG. 4, FIG. 5, and FIG. 8. This alternate embodiment of the peak reduction algorithm circuit block provides weighting to the calculated additive correction vector applied to the peak causing symbols in each carrier. Weighting is based on the fractional power each peak causing symbol provides to the combined signal.

Another way of distributing the correction signal to each carrier path, which may be preferred in many applications, is to weight the correction based on the instantaneous average symbol power of each carrier path. (Other weighting schemes, such as average power or short term average power, may also be used and the modifications to the below described embodiment will be appreciated by those skilled in the art.) Referring to FIG. 17, an alternate embodiment of the peak reduction algorithm block 58 is shown for such a weighting scheme. This alternate embodiment illustrates in block schematic form a weighting circuit 120 which provides this peak correction distribution weighting scheme. The weighting circuit 120 receives as inputs the weighted symbols $ws_{k,m}$ from the filter predictor 54 generated as described above. The weighted symbols $ws_{k,m}$ are provided to power detection circuits 122 which determine instantaneous average symbol power A of each carrier. Implementation of suitable power detection circuits will be apparent to those skilled in the art and the number of symbols averaged to find the instantaneous power may be optimized for the particular application. The power from each carrier is provided to summer 124 which outputs a total instantaneous power value B which value is provided as one input to each of K division circuits 126. The ratio of the individual carrier power A to total power B for each carrier is computed at division circuits 126 and the power weighting A/B for each carrier is output as illustrated. The power weighting A/B for each carrier is provided to the corresponding symbol correction path after symbol correction phase adjustment stage 112. The power weighting for the carrier is then applied to the correction value by multipliers 128 as illustrated. The power weighted correction values are then output.

In the embodiment of FIG. 17, since the correction distribution is provided by the above mentioned weighting circuit 120, rather than equally weighting based on the number of carriers as in equation (2), the algorithm processor equation must be changed to Equation (3) below. Also, the correction provided by the illustrated peak reduction block is additive and should be used with additive combiners when incorporated in systems shown in FIG. 4, FIG. 11, and FIG. 12.

$$C = \left( L \frac{B}{|B|} - B \right) \frac{1}{(g_{m,0})} \qquad (3)$$

Figure 18:
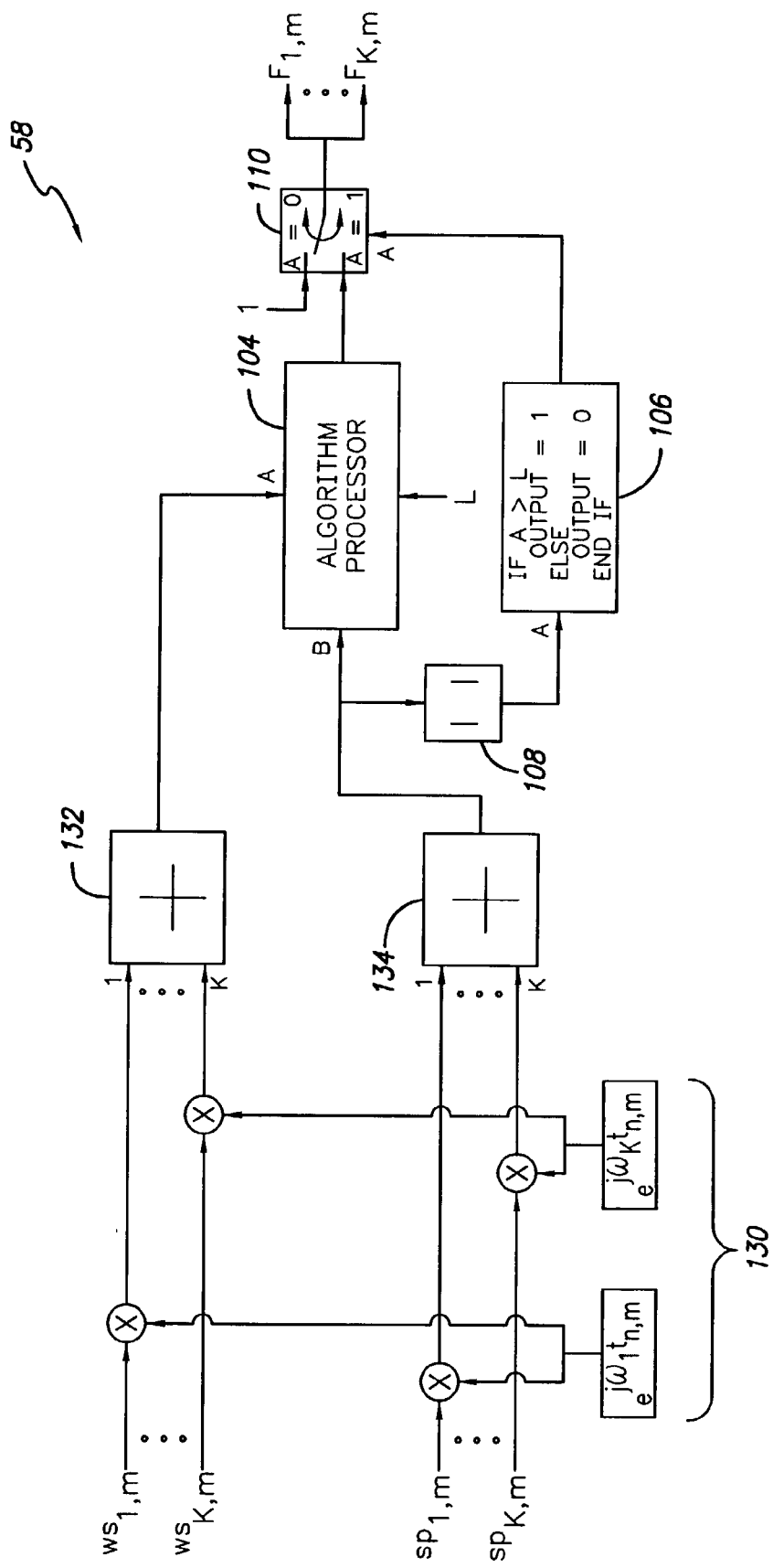
FIG. 18 is block schematic drawing of an alternate embodiment of the peak reduction algorithm circuit block shown in FIG. 4, FIG. 5, and FIG. 8. This alternate embodiment of the peak reduction algorithm circuit block provides a gain based correction to the peak causing symbols.

Referring to FIG. 18, an alternate embodiment of the peak reduction algorithm block 58 providing gain based correction instead of additive correction, is shown. In this embodiment, the peak reduction algorithm block 58 calculates a correction gain that is multiplied to adjust each of the peak causing symbols in each carrier. The vector A shown in FIG. 14 is created in the same way as the combined multiple carrier predicted output B. More specifically, a phase shifting stage 130 applies a phase rotation to the input weighted symbols and the input predicted symbols, provided from the filter predictor as described previously. These phase shifted signals are provided to first and second summers 132, 134 which provide the signals A and B as outputs. Both these signals, and the peak limit level L, are provided to the algorithm processor 106. The algorithm processor 106 first calculates the correction signal using Equation (3). Next, the algorithm processor calculates a correction gain using Equation (4) below. As in the case of the previous embodiments, switch 110 outputs a zero correction (unit gain in this embodiment) if comparator 106 determines the predicted combined symbol value is within the limit L. If the limit value L is exceeded the correction gain is output from switch 110. Since the correction is based on a gain, no phase adjustments to the correction are required after the correction value is output from switch 110. The correction gain is provided to the circuits shown in FIG. 4, FIG. 11, or FIG. 12 and the combiners used in these figures must be set to perform a multiplying function.

$$g = (A + C) \frac{1}{A} \qquad (4)$$

In the above peak reduction algorithm descriptions of FIG. 15, FIG. 17, and FIG. 18 the Equations (1) through (4) were used to limit the peak power of the multiple carrier signal. These equations always produce a minimum instantaneous amplitude peak power correction. There are however many equations which will move vector B in FIG. 14 to the peak limit level. To illustrate the manner in which additional equations can be developed and to show that the present invention is not limited to just the specific set of equations discussed, an alternate peak limiting equation will be developed. This alternate equation will produce minimum phase error in the combined multiple carrier signal.

Figure 19:
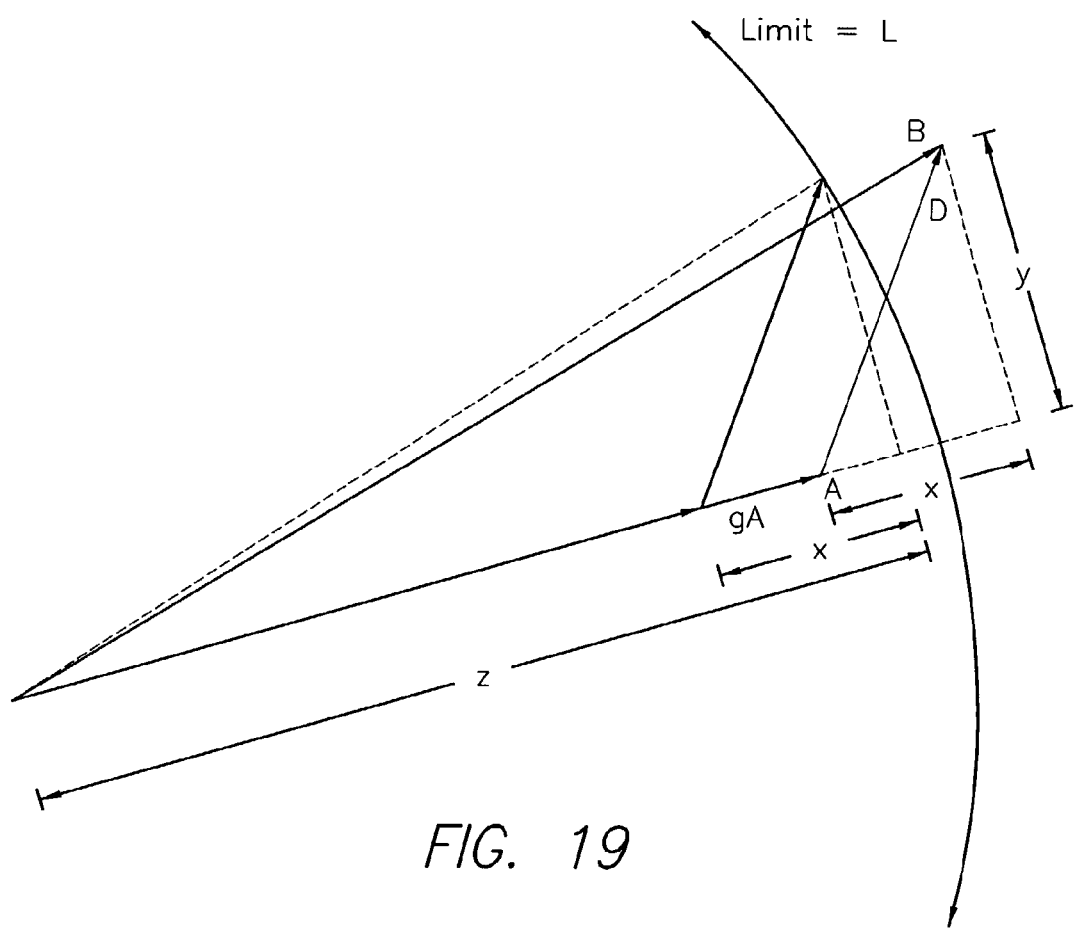
FIG. 19 illustrates the geometric development of a minimum phase error correction function which can be applied as an algorithm to calculate peak reduction corrections to input symbols.

Referring to FIG. 19, an alternate equation of peak signal correction is developed geometrically. The goal of this correction equation development is to move the combined multiple carrier output vector B to the peak limit level L by adjusting only the amplitude of the combined weighted symbol vector A. This type of correction may be preferred in communication systems where phase errors cause more problems than amplitude errors. The following series of vector equations conclude with the gain correction equation, Equation (5). Equation (5) can be used in place of Equations (3) and (4) in the algorithm processor block of FIG. 18. By using equation (5) in the peak reduction algorithm shown in FIG. 18 only amplitude errors will be induced in the individual carrier symbols.

$$L^2 = z^2 + y^2 \qquad (5)$$
$$z = \sqrt{L^2 - y^2}$$
$$g|A| = \sqrt{L^2 - y^2} - x$$
$$x = \frac{D \cdot A}{|A|}$$
$$y = \left| D - \frac{(D \cdot A)A}{|A|^2} \right|$$
$$g = \left( \sqrt{L^2 - \left| D - \frac{(D \cdot A)A}{|A|^2} \right|^2} - \frac{(D \cdot A)}{|A|} \right) \frac{1}{|A|}$$

Equation (5) may produce an excessive computational burden to the implementing signal processor or signal processing circuits. To reduce this burden the alternate approximate equation given in Equation (6) can be used instead. This approximate equation will permit multiple carrier peak signal to exceed the limit level by a small amount but no phase errors will be induced $$g \approx \frac{L + |A| - |B|}{|A|}, \text{ for small } `D` \qquad (6)$$

If additive corrections are preferred in a particular application over multiplicative corrections, Equations (5) and (6) can be modified to additive corrections using Equation (7) for use in the peak reduction algorithm given in FIG. 15 and Equation (8) for use with FIG. 16. (Using these modified equations will guarantee minimum phase error correction to the combined multiple carrier signal but not necessarily to the individual carrier symbols.)

$$C = (A - gA) \frac{1}{K * g_{m,0}} \qquad (7)$$

$$C = (A - gA) \frac{1}{g_{m,0}} \qquad (8)$$

The purpose of developing Equations (5) through (8) was to demonstrate that many peak reduction equations could operate equally well within the present invention.

To aid those skilled in the art reach a fuller understanding of the present invention, various complete implementations of the peak reduction unit 12 will be provided as examples. First several implementations employing a series reduction process, as shown in FIG. 3, will be provided as examples.

Figure 20:
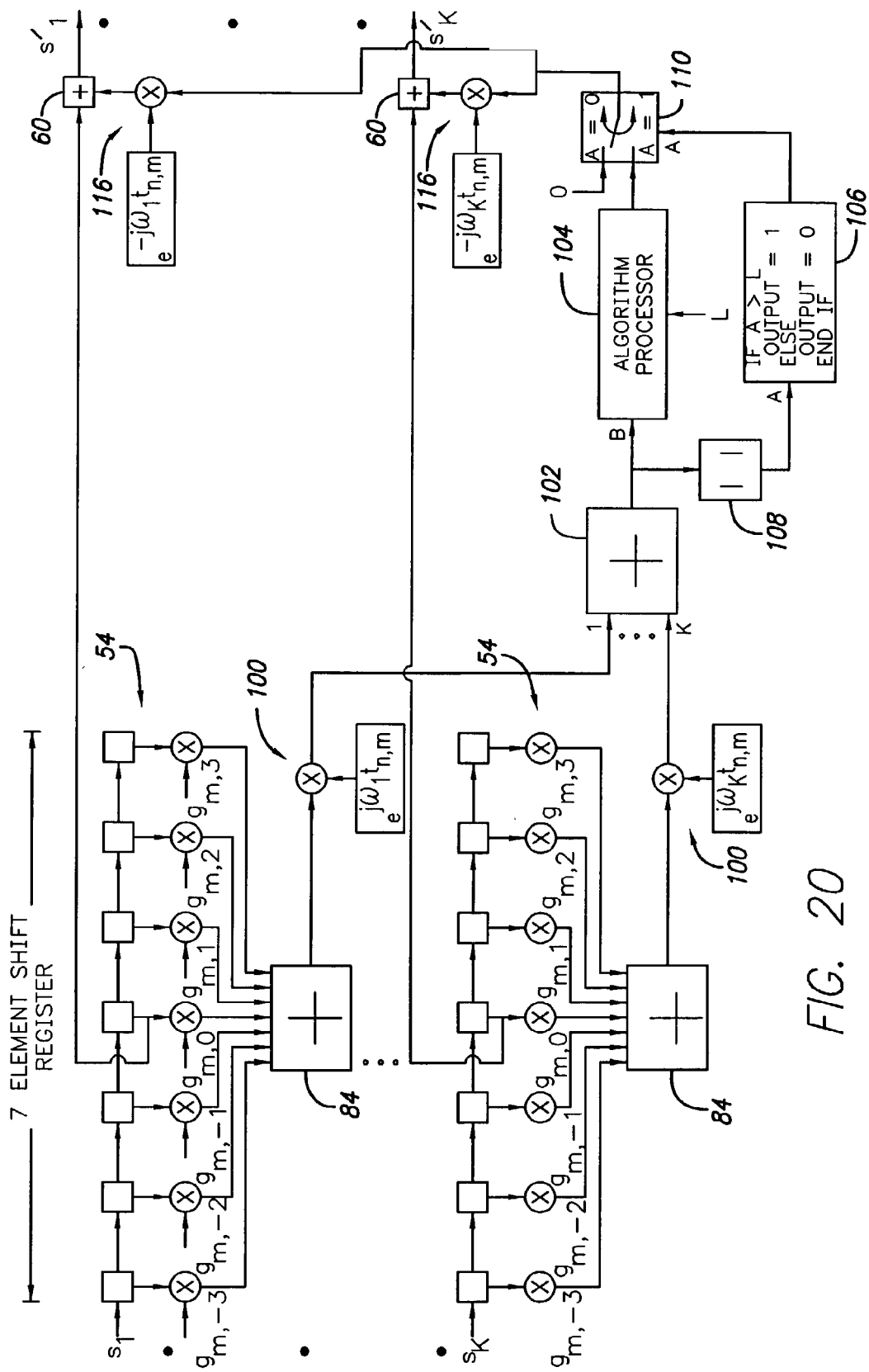
FIG. 20 is a block schematic drawing illustrating a detailed implementation of FIG. 4 with the block schematic drawings shown in FIG. 10 and FIG. 16.

FIG. 20 is a block schematic drawing illustrating a detailed implementation of FIG. 4 with the block schematic drawings shown in FIG. 10 and FIG. 15. Like numerals employed in FIGS. 4, 10 and 15 are employed in FIG. 20 and the operation of the implementation will be appreciated from the previous discussion of those figures.

Figure 21:
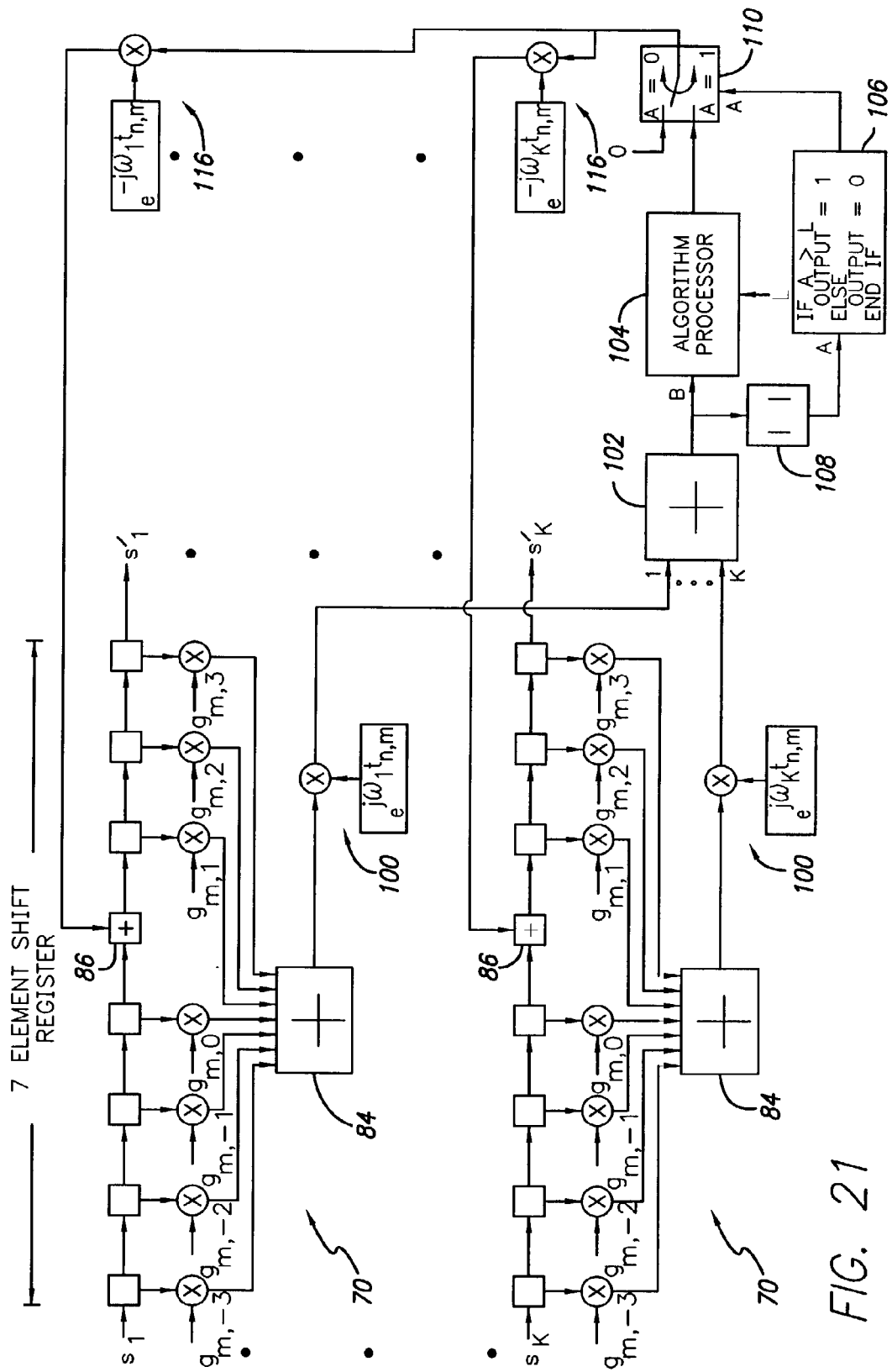
FIG. 21 is a block schematic drawing illustrating a detailed implementation of FIG. 5 with the block schematic drawings shown in FIG. 11 and FIG. 16.

FIG. 21 is a block schematic drawing constructing a detailed implementation of FIG. 5 with the block schematic drawings shown in FIG. 11 and FIG. 15. Like numerals employed in FIGS. 5, 11 and 15 are employed in FIG. 21 and the operation of the implementation will be appreciated from the previous discussion of those figures.

Figure 22:
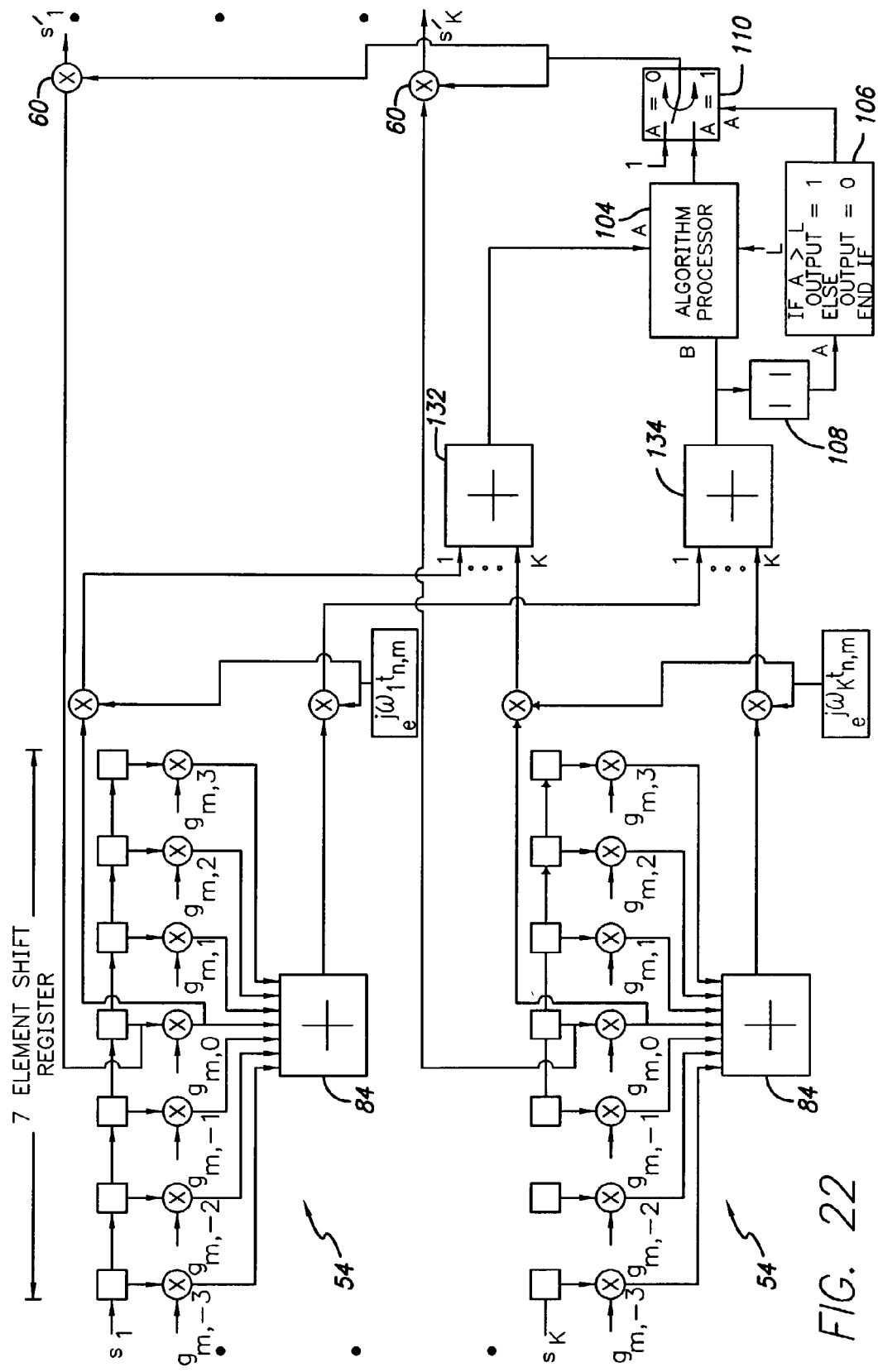
FIG. 22 is a block schematic drawing illustrating a detailed implementation of FIG. 4 with the block schematic drawings shown in FIG. 10 and FIG. 18.

FIG. 22 is a block schematic drawing illustrating a detailed implementation of FIG. 4 with the block schematic drawings shown in FIG. 10 and FIG. 18. Like numerals employed in FIGS. 4, 10 and 18 are employed in FIG. 22 and the operation of the implementation will be appreciated from the previous discussion of those figures.

Figure 23:
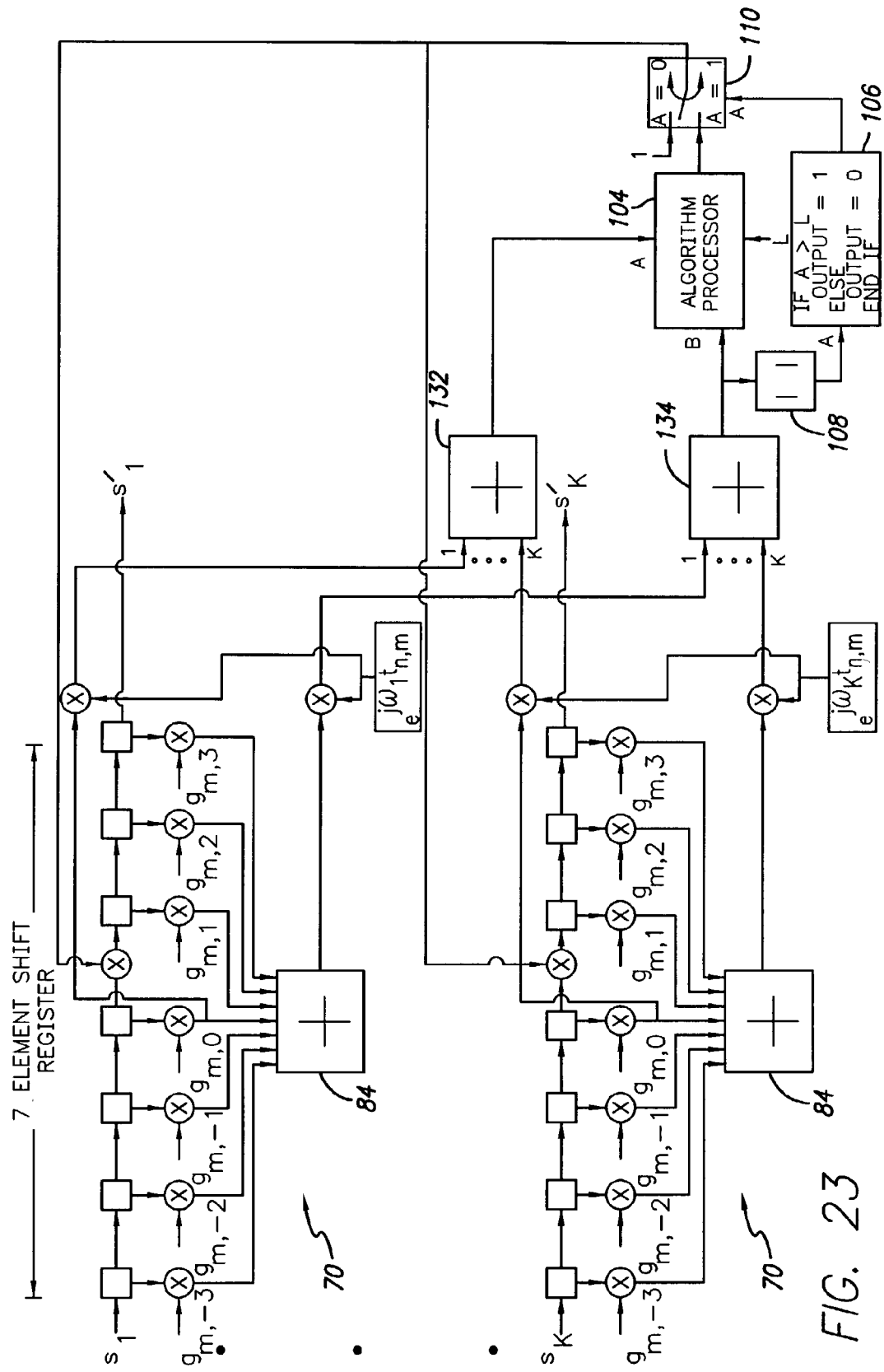
FIG. 23 is a block schematic drawing illustrating a detailed implementation of FIG. 5 with the block schematic drawings shown in FIG. 11 and FIG. 18.

FIG. 23 is a block schematic drawing illustrating a detailed implementation of FIG. 5 with the block schematic drawings shown in FIG. 11 and FIG. 18. Like numerals employed in FIGS. 5, 11 and 18 are employed in FIG. 23 and the operation of the implementation will be appreciated from the previous discussion of those figures.

Figure 24:
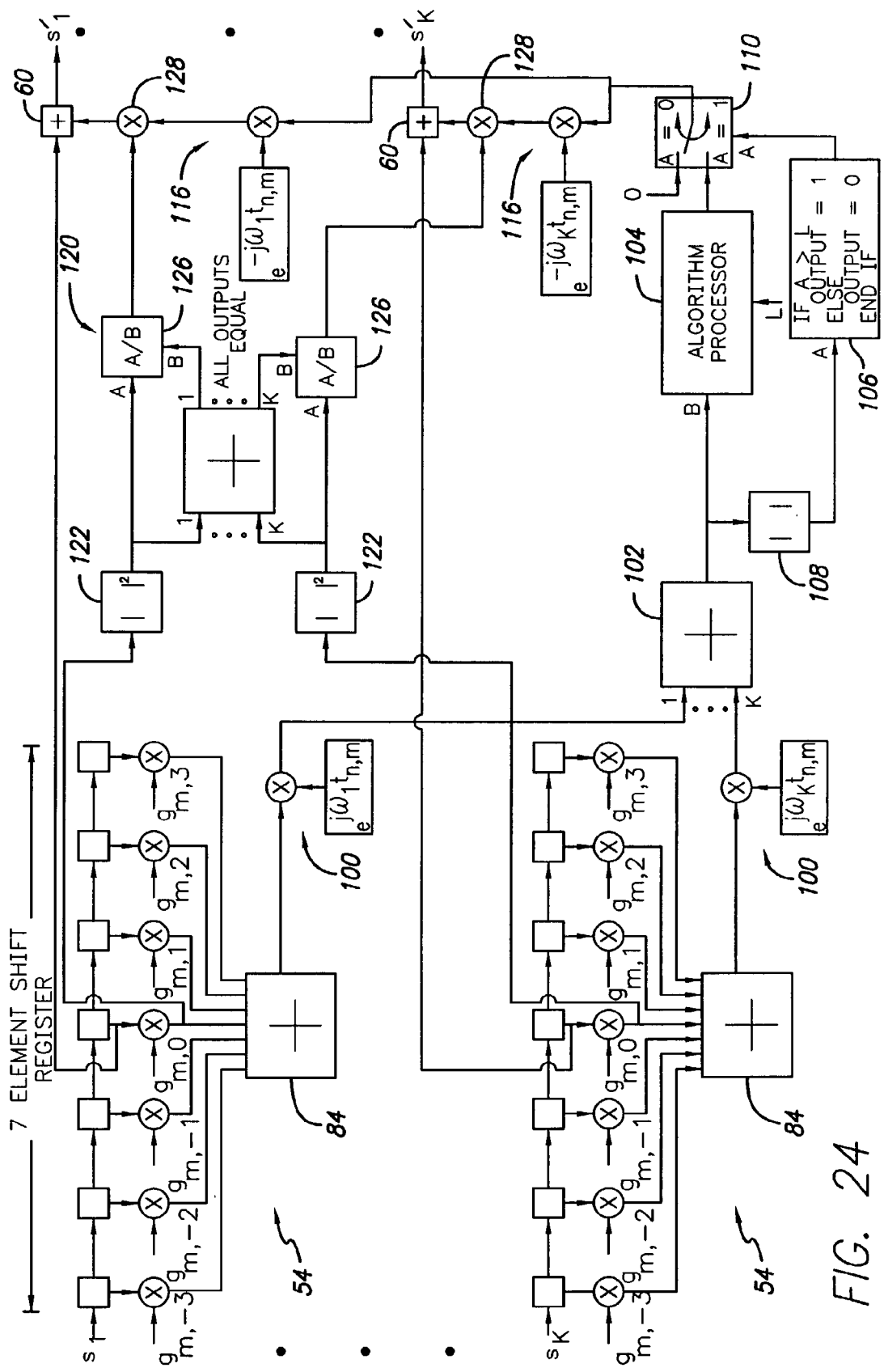
FIG. 24 is a block schematic drawing illustrating a detailed implementation of FIG. 4 with the block schematic drawings shown in FIG. 10 and FIG. 17.

FIG. 24 is a block schematic drawing illustrating a detailed implementation of FIG. 4 with the block schematic drawings shown in FIG. 10 and FIG. 17. Like numerals employed in FIGS. 4, 10 and 17 are employed in FIG. 24 and the operation of the implementation will be appreciated from the previous discussion of those figures.

Figure 25:
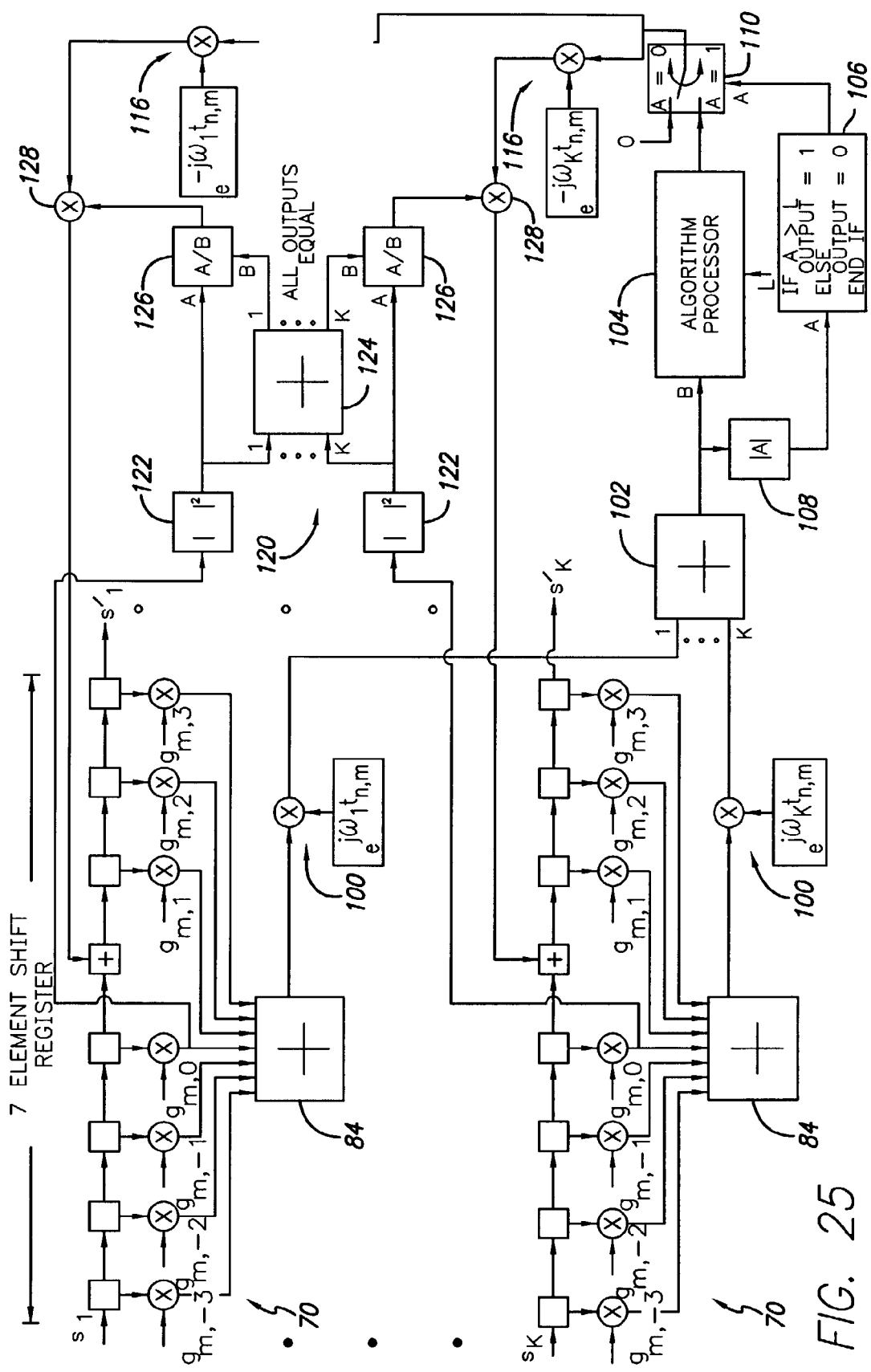
FIG. 25 is a block schematic drawing illustrating a detailed implementation of FIG. 5 with the block schematic drawings shown in FIG. 11 and FIG. 17.

FIG. 25 is a block schematic drawing illustrating a detailed implementation of FIG. 5 with the block schematic drawings shown in FIG. 11 and FIG. 17. Like numerals employed in FIGS. 5, 11 and 17 are employed in FIG. 25 and the operation of the implementation will be appreciated from the previous discussion of those figures.

Next several implementations employing a parallel peak reduction process, as shown in FIGS. 6 and 7 will be provided as examples.

Figure 26A:
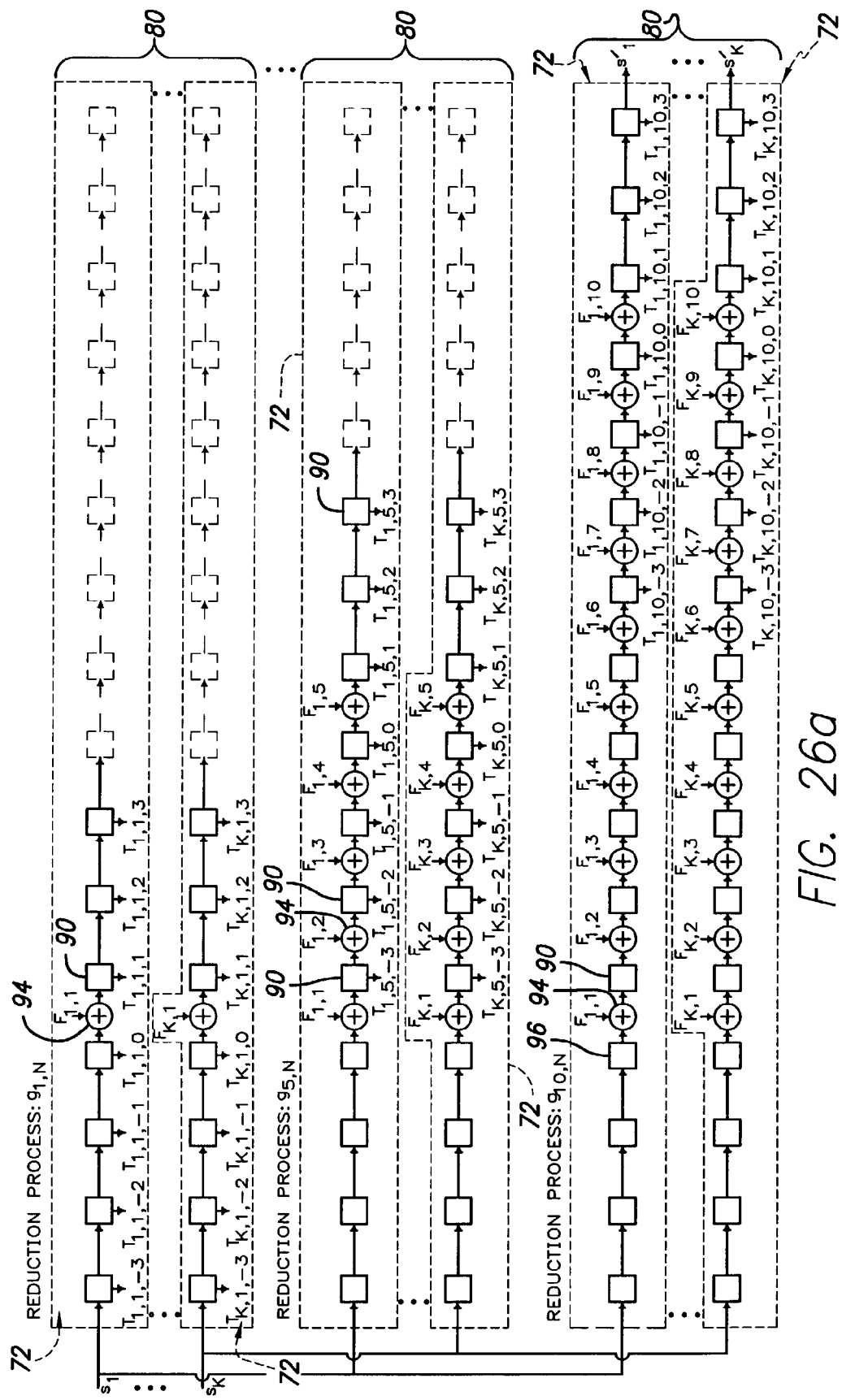
FIGS. 26a, 26b and 26c are block schematic drawings collectively illustrating a detailed implementation of FIG. 6 with the block schematic drawings shown in FIGS. 8, 12 and 17.
Figure 26B:
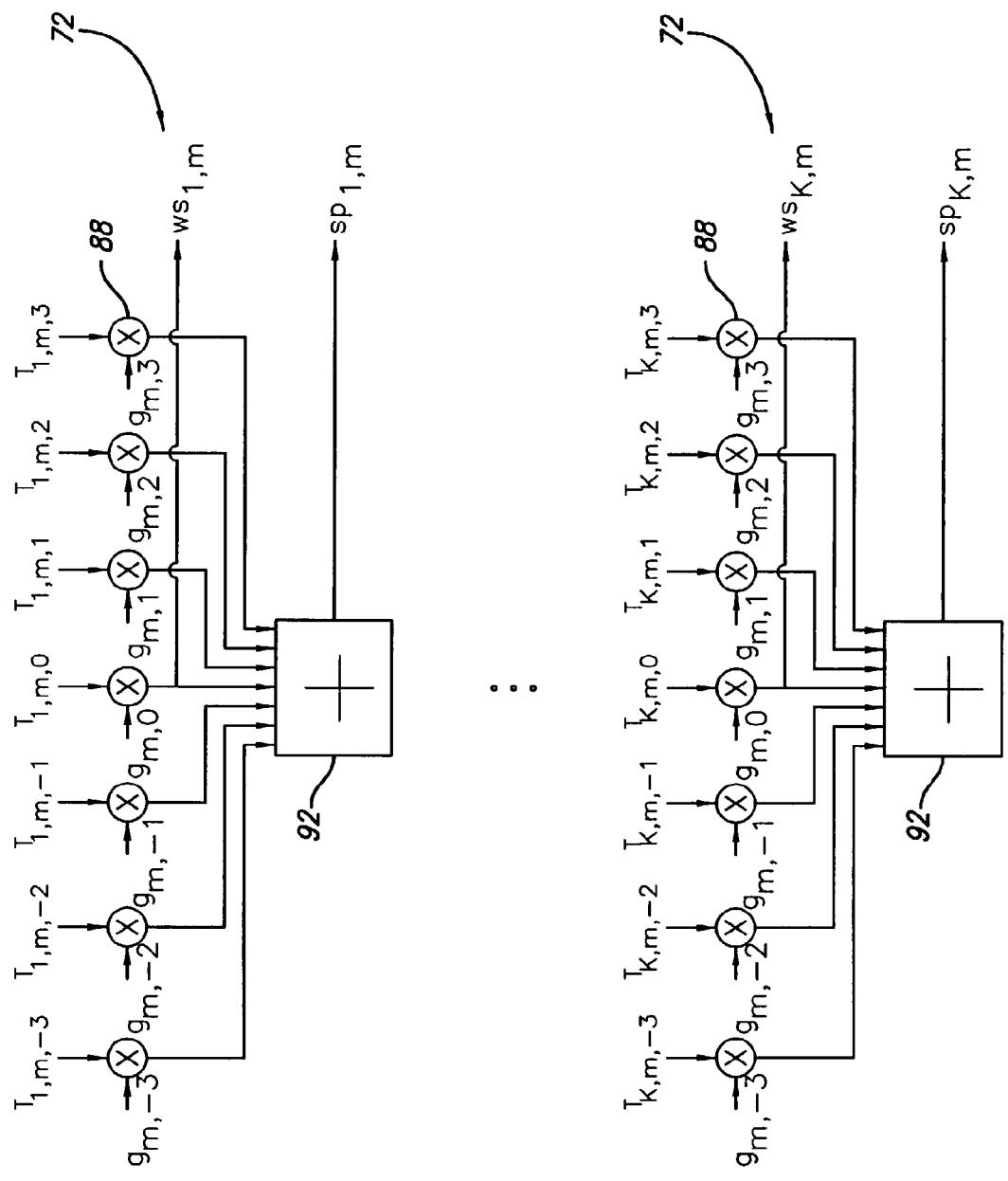
Figure 26C:
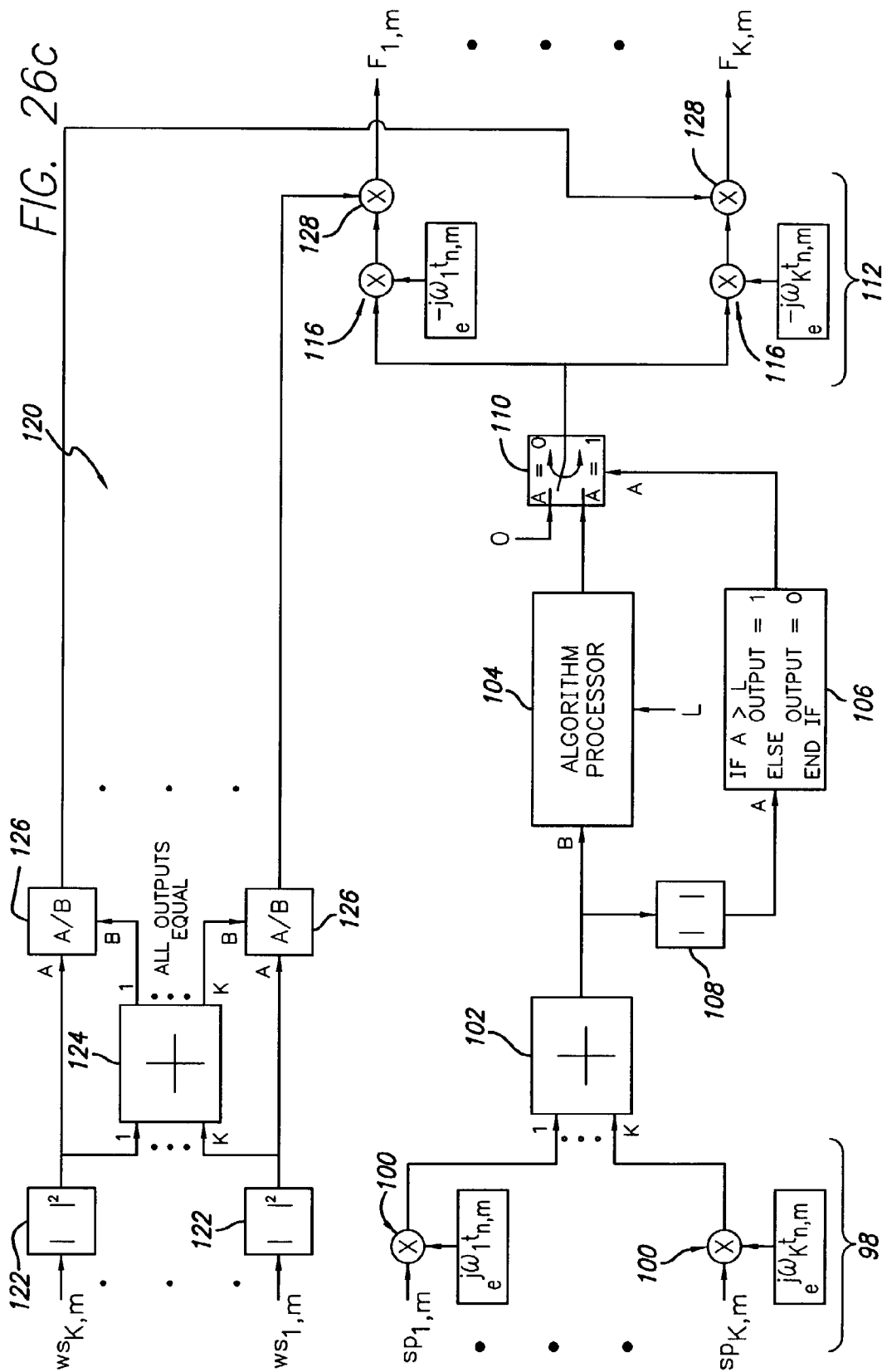

FIGS. 26a, 26b and 26c are block schematic drawings collectively illustrating a detailed implementation of FIG. 6 with the block schematic drawings shown in FIGS. 8, 12 and 17. Like numerals employed in FIGS. 6, 8, 12 and 17 are employed in FIGS. 26a, 26b and 26c and the operation of the implementation will be appreciated from the previous discussion of those figures. In this embodiment the shift register portion of the filter predictor 72 varies between stages 80, so FIG. 26a shows the shift register portion of the filter predictor 72 for all the stages 80. The dashed delay stages of the shift register are not employed in the filter prediction operation and may be omitted and are merely shown to clarify the logical layout of the filter predictor. The remaining circuit portions are the same for each stage 80 and so FIGS. 26b and 26c only show the block schematic drawings for a single stage 80.

Figure 27A:
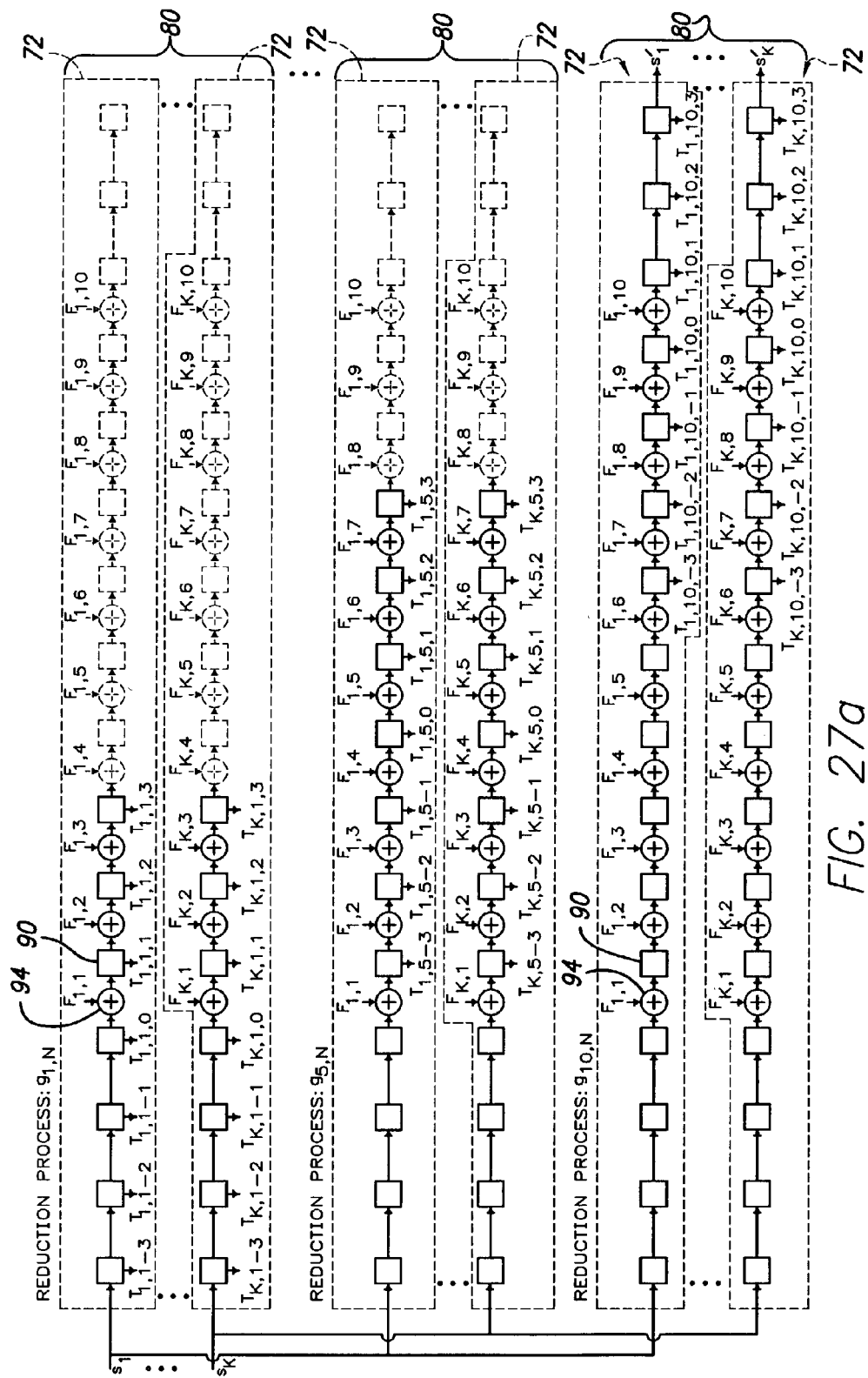
FIGS. 27a, 27b and 27c are block schematic drawings collectively illustrating a detailed implementation of FIG. 7 with the block schematic drawings shown in FIGS. 8, 12 and 17.
Figure 27B:
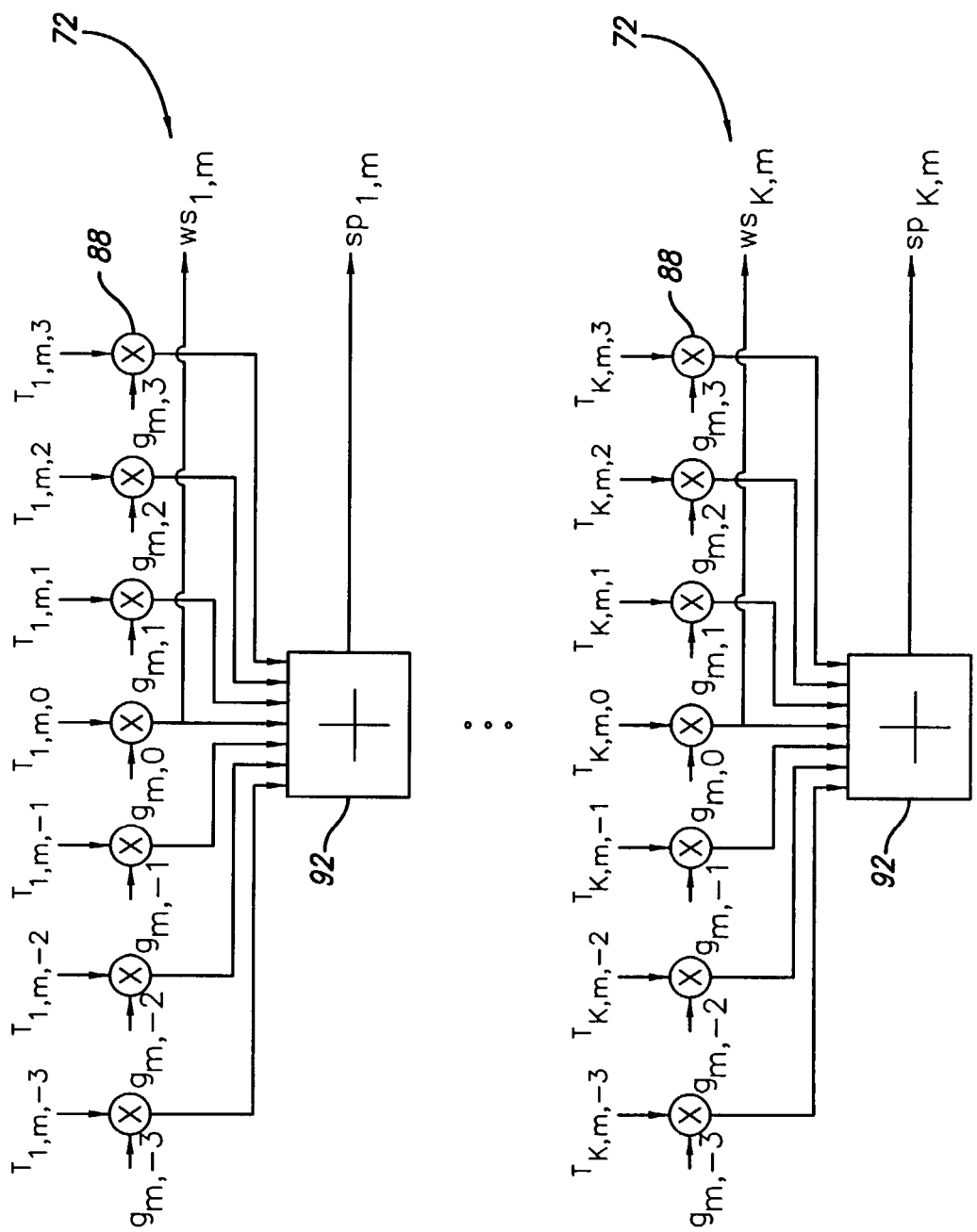
Figure 27C:
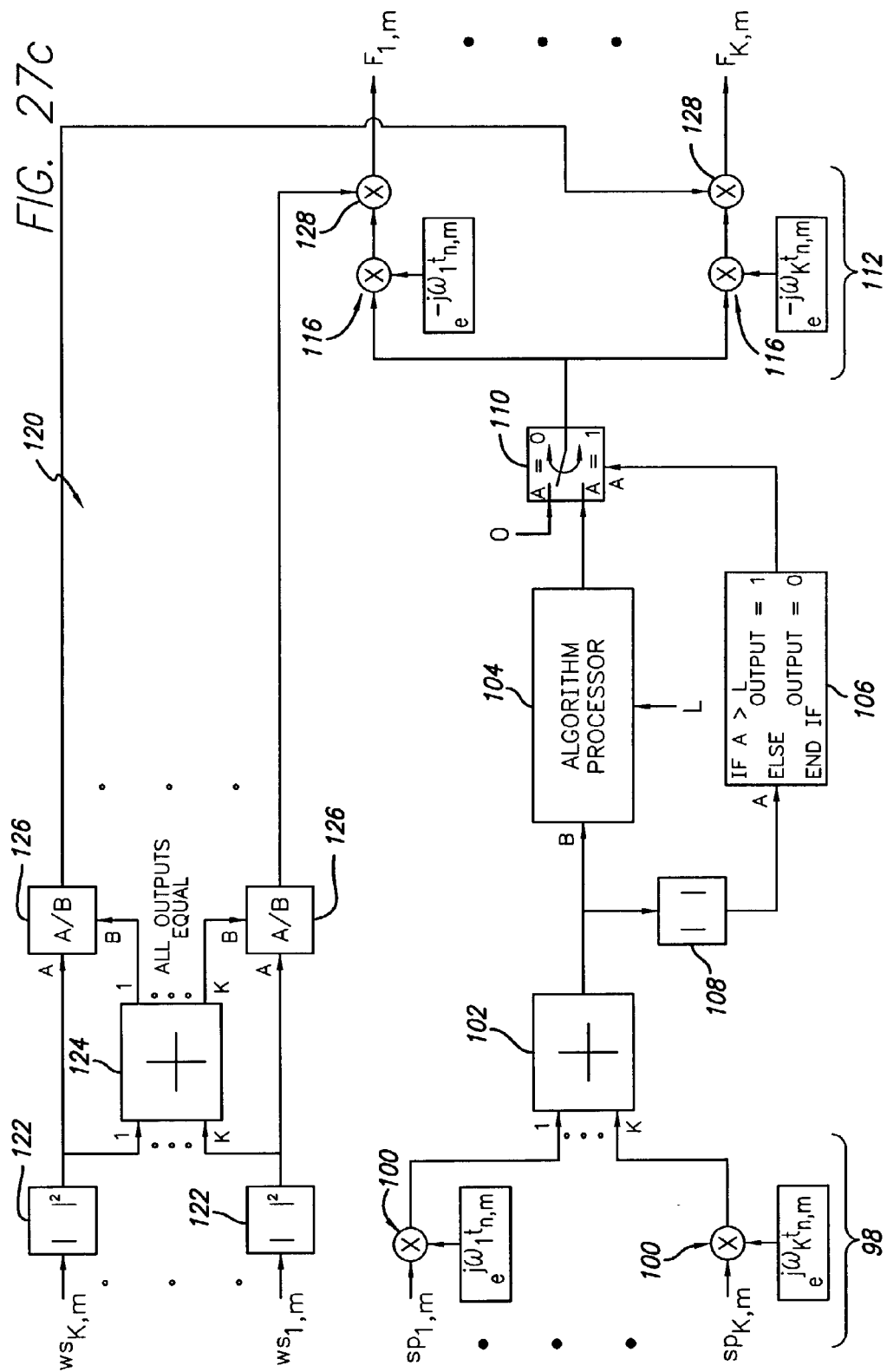

FIGS. 27a, 27b and 27c are block schematic drawings collectively illustrating a detailed implementation of FIG. 7 with the block schematic drawings shown in FIGS. 8, 12 and 17. Like numerals employed in FIGS. 7, 8, 12 and 17 are employed in FIGS. 27a, 27b and 27c and the operation of the implementation will be appreciated from the previous discussion of those figures. As in the previous embodiment, in this embodiment the shift register portion of the filter predictor 72 varies between stages 80 and FIG. 27a shows the shift register portion of the filter predictor 72 for all the stages 80 while the remaining circuit portions are the same for each stage 80 and so FIGS. 27b and 27c only show the block schematic drawings for a single stage 80.

Figure 28A:
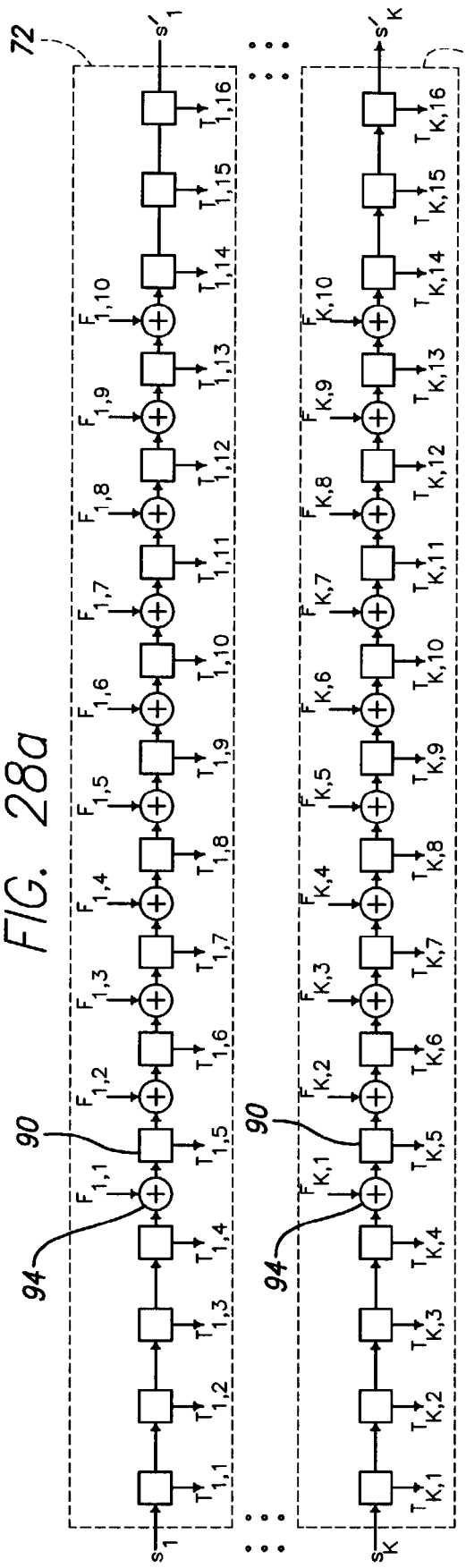
FIGS. 28a, 28b and 28c are block schematic drawings collectively illustrating an alternate embodiment of a detailed implementation of FIG. 7 with the block schematic drawings shown in FIGS. 8, 12 and 17 and employing an alternate embodiment of the filter predictor of FIG. 12 with shared memory registers.
Figure 28B:
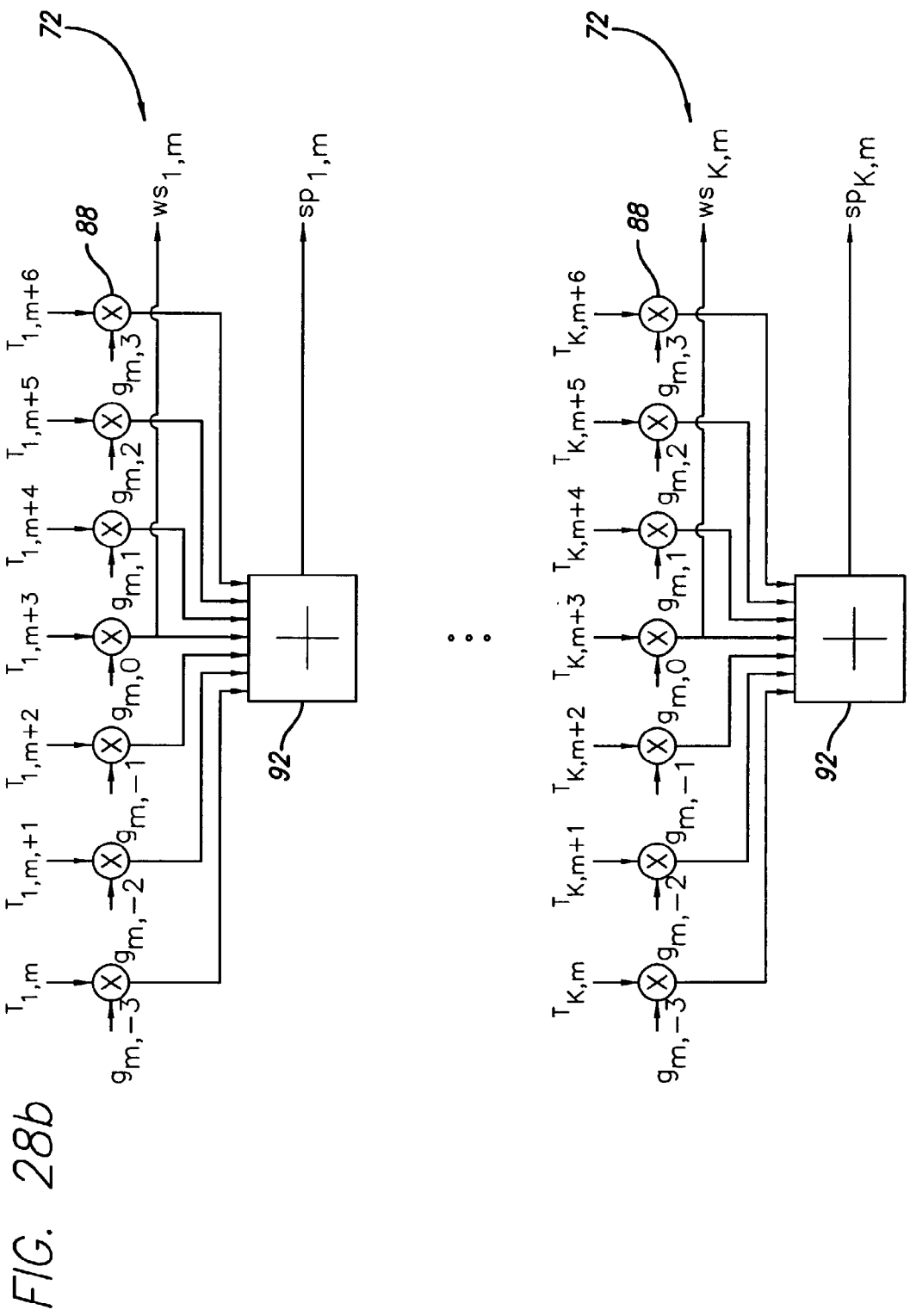
Figure 28C:
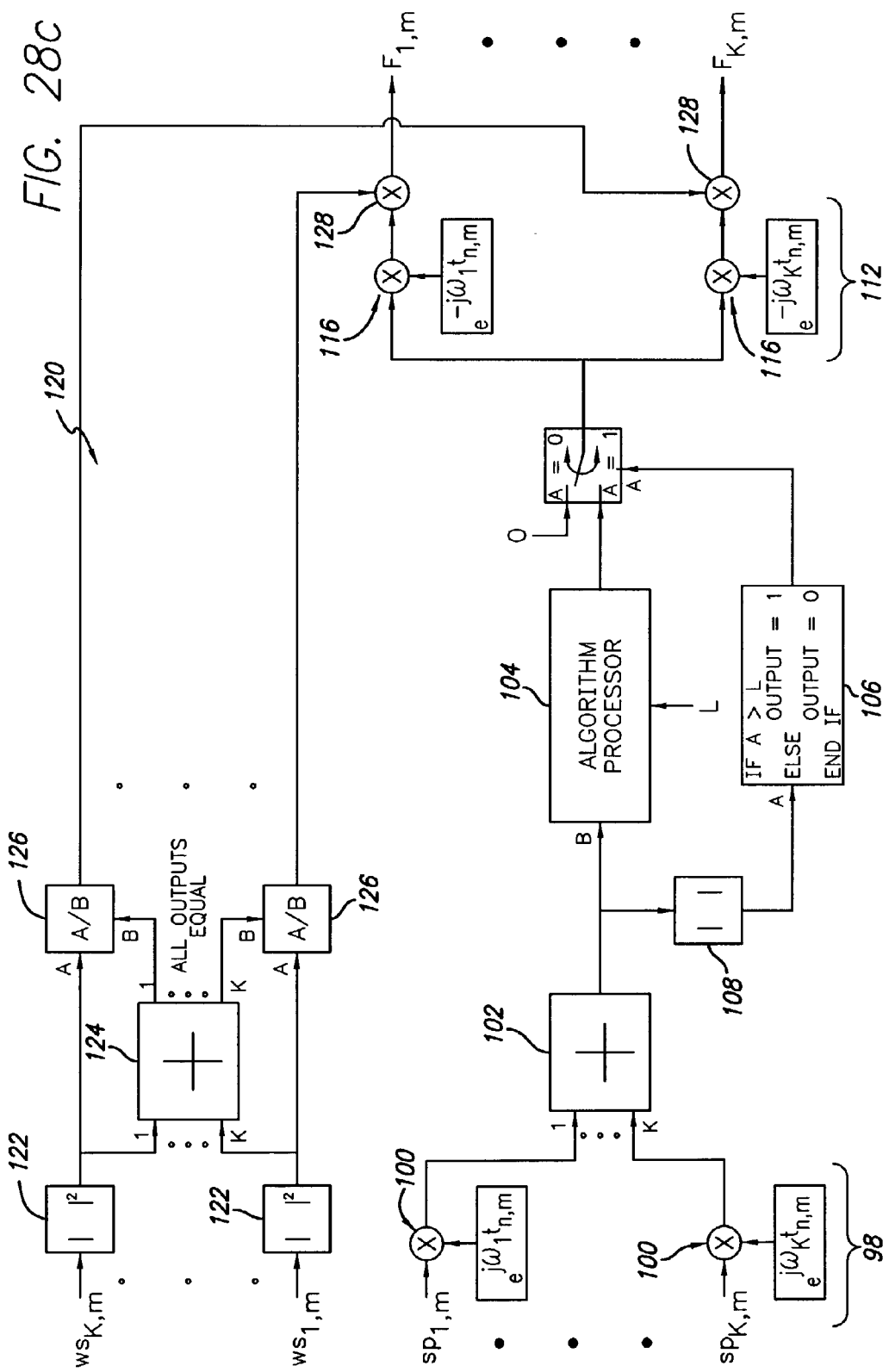

FIGS. 28a, 28b and 28c are block schematic drawings illustrating an alternate embodiment of a detailed implementation of FIG. 7 with the block schematic drawings shown in FIGS. 8, 12 and 17. Like numerals employed in FIGS. 7, 8, 12 and 17 are employed in FIGS. 28a, 28b and 28c and the operation of the implementation will be appreciated from the previous discussion of those figures. In this embodiment the shift register portion of the filter predictor 72 is shared between stages 80, so FIG. 28a shows the shift register portion of the filter predictor 72 which is common to all the stages 80. The remaining circuit portions are repeated for each stage 80 and so FIGS. 28b and 28c only show the block schematic drawings for a single stage 80. This shared shift register embodiment may be preferred due to the reduced number of memory registers needed and reduced memory costs.

Figure 29A:
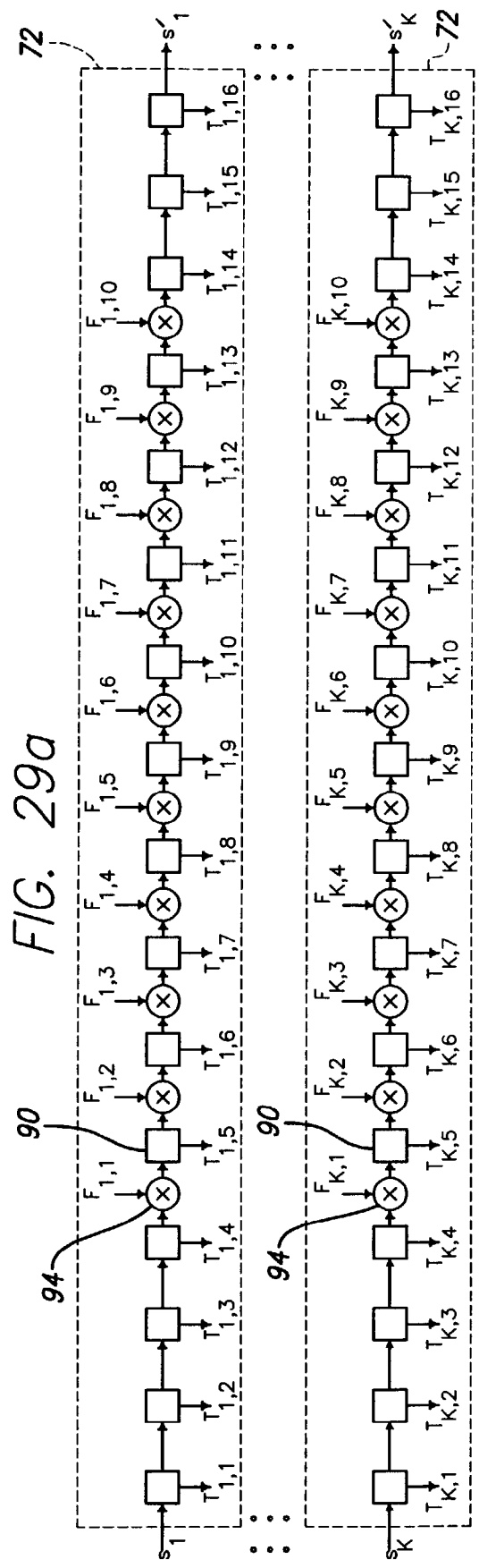
FIGS. 29a, 29b and 29c are block schematic drawings illustrating a detailed implementation of FIG. 7 with the block schematic drawing shown in FIGS. 8, 12 and 18 employing an alternate embodiment of the filter predictor of FIG. 12 with shared memory registers.
Figure 29B:
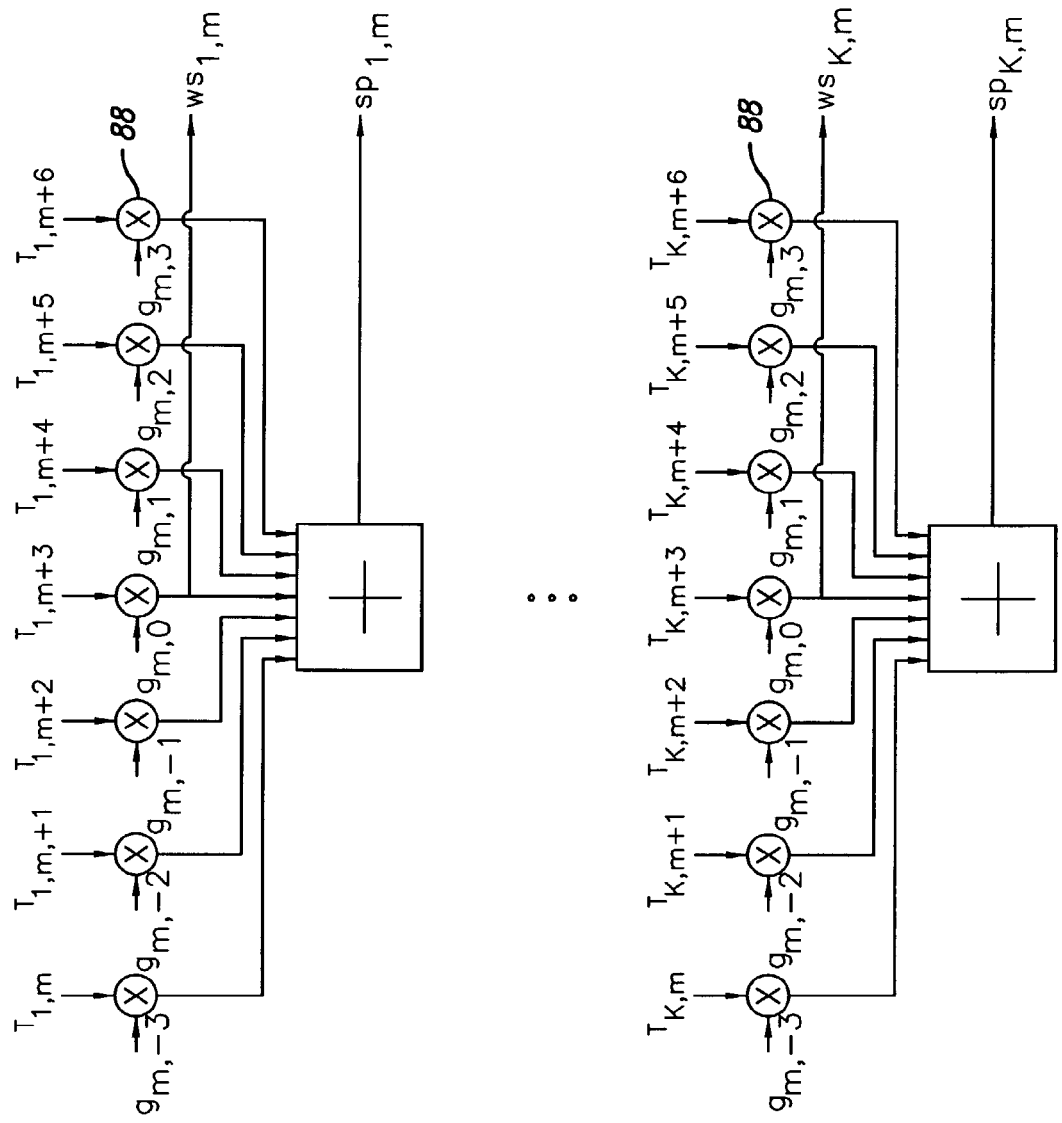
Figure 29C:
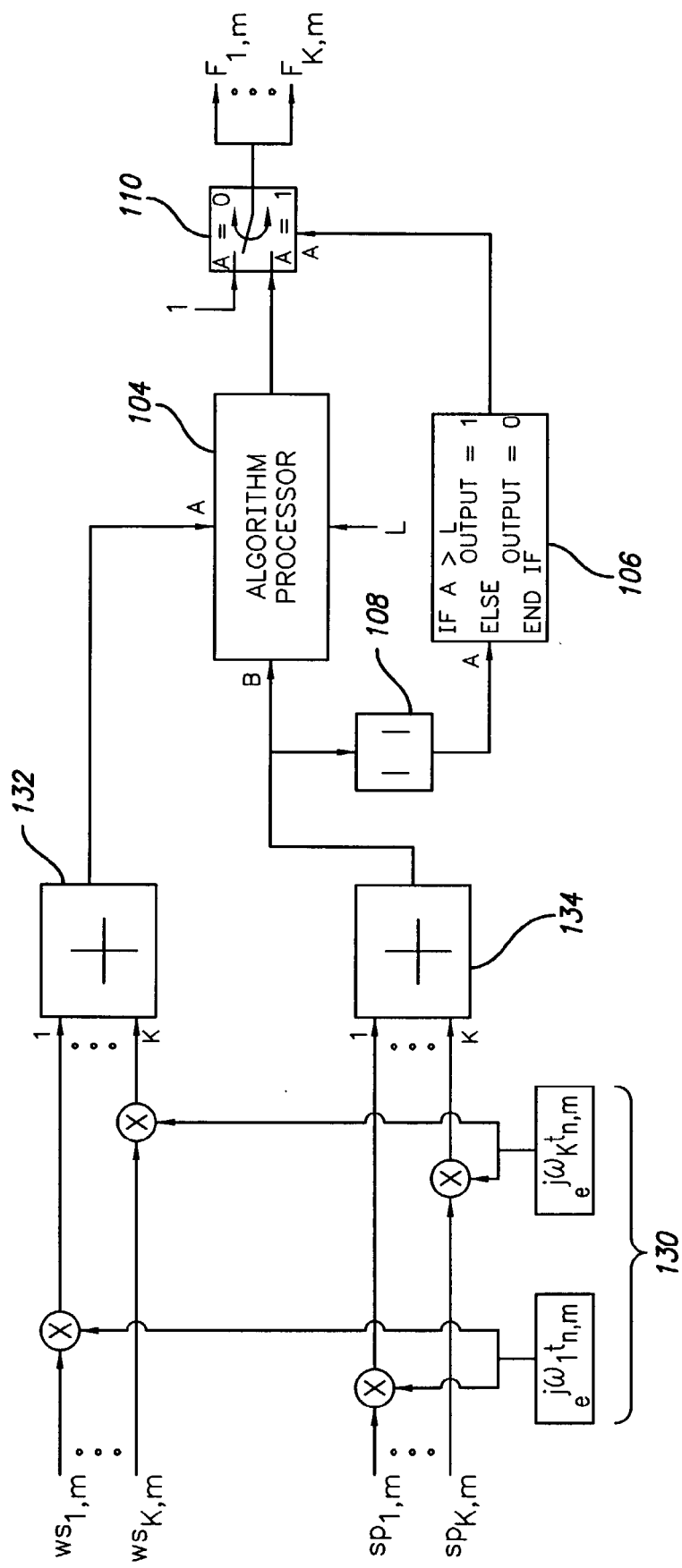

FIGS. 29a, 29b and 29c are block schematic drawings illustrating a detailed implementation of FIG. 7 with the block schematic drawings shown in FIGS. 8, 12 and 18. Like numerals employed in FIGS. 7, 8, 12 and 18 are employed in FIGS. 29a, 29b and 29c and the operation of the implementation will be appreciated from the previous discussion of those figures. As in the previous embodiment, in this embodiment the shift register portion of the filter predictor 72. is shared between stages 80, so FIG. 29a shows the shift register portion of the filter predictor 72 which is common to all the stages 80. The remaining circuit portions are repeated for each stage 80 and so FIGS. 29b and 29c only show the block schematic drawings for a single stage 80.

From these examples a variety of additional series and parallel implementations of the peak reduction process of the present invention will be appreciated by those skilled in the art which specific implementations are too numerous to illustrate in detail.

Figure 30:
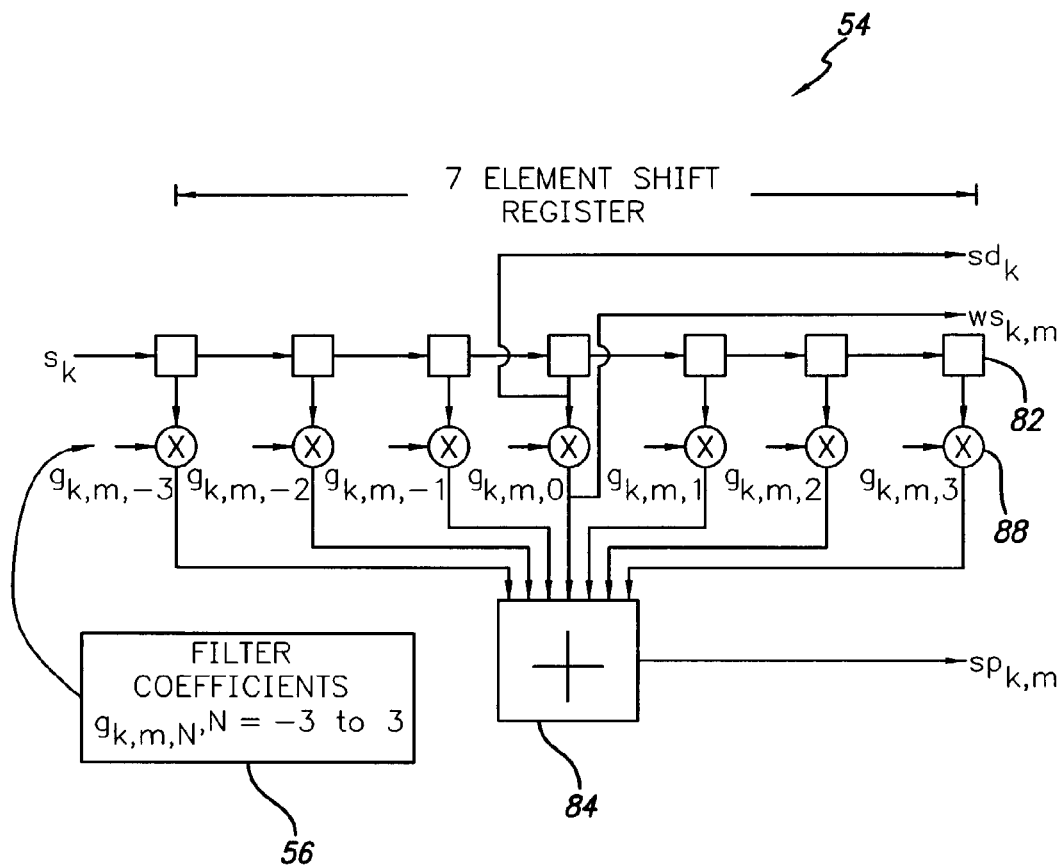
FIG. 30 is a block schematic drawing of an alternate embodiment of FIG. 10 modified to include the changes required when using different baseband filters in the individual carrier generation paths.
Figure 31:
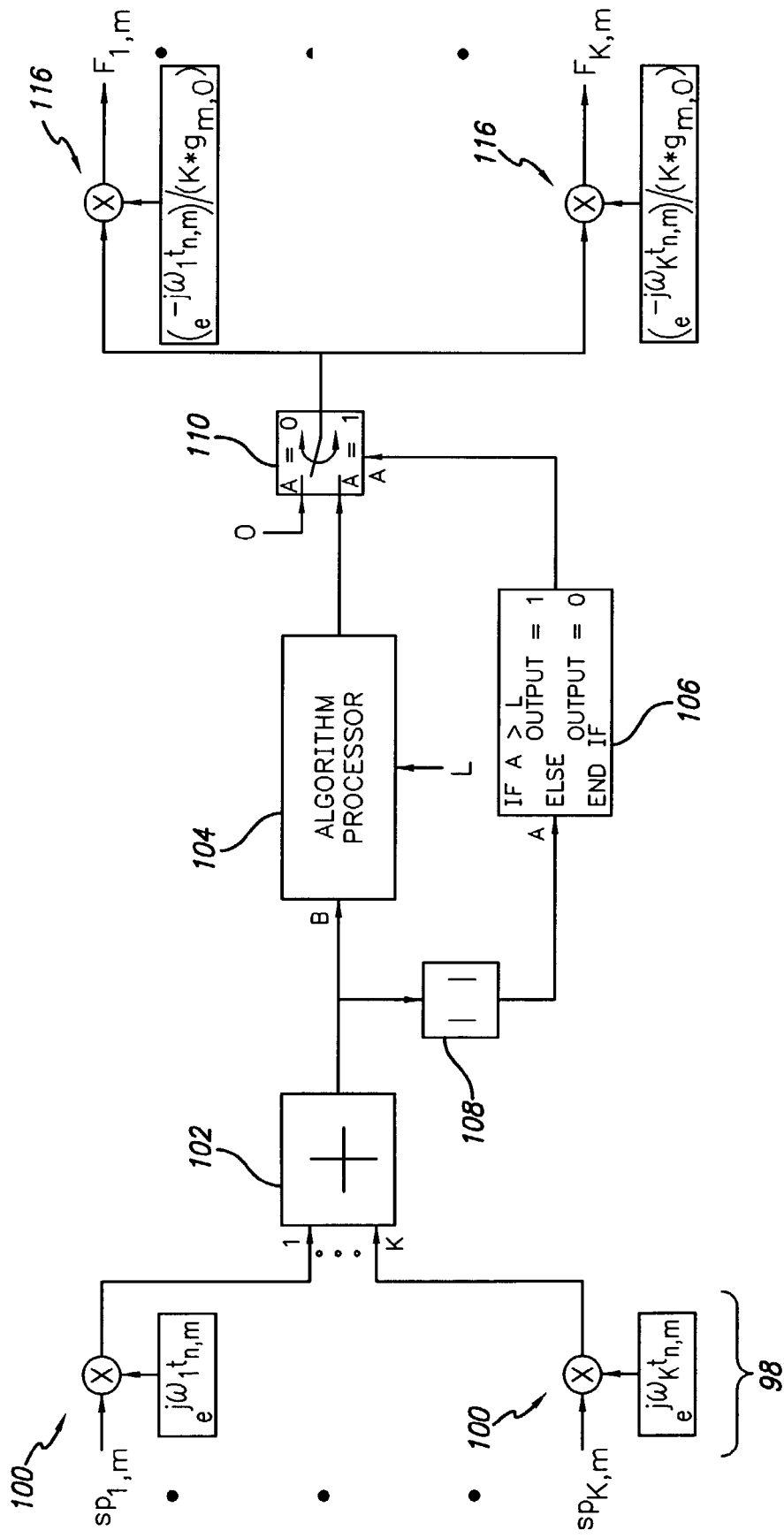
FIG. 31 is a block schematic drawing of an alternate embodiment of FIG. 15 modified to include the changes required when using different baseband filters in the individual carrier generation paths.
Figure 32:
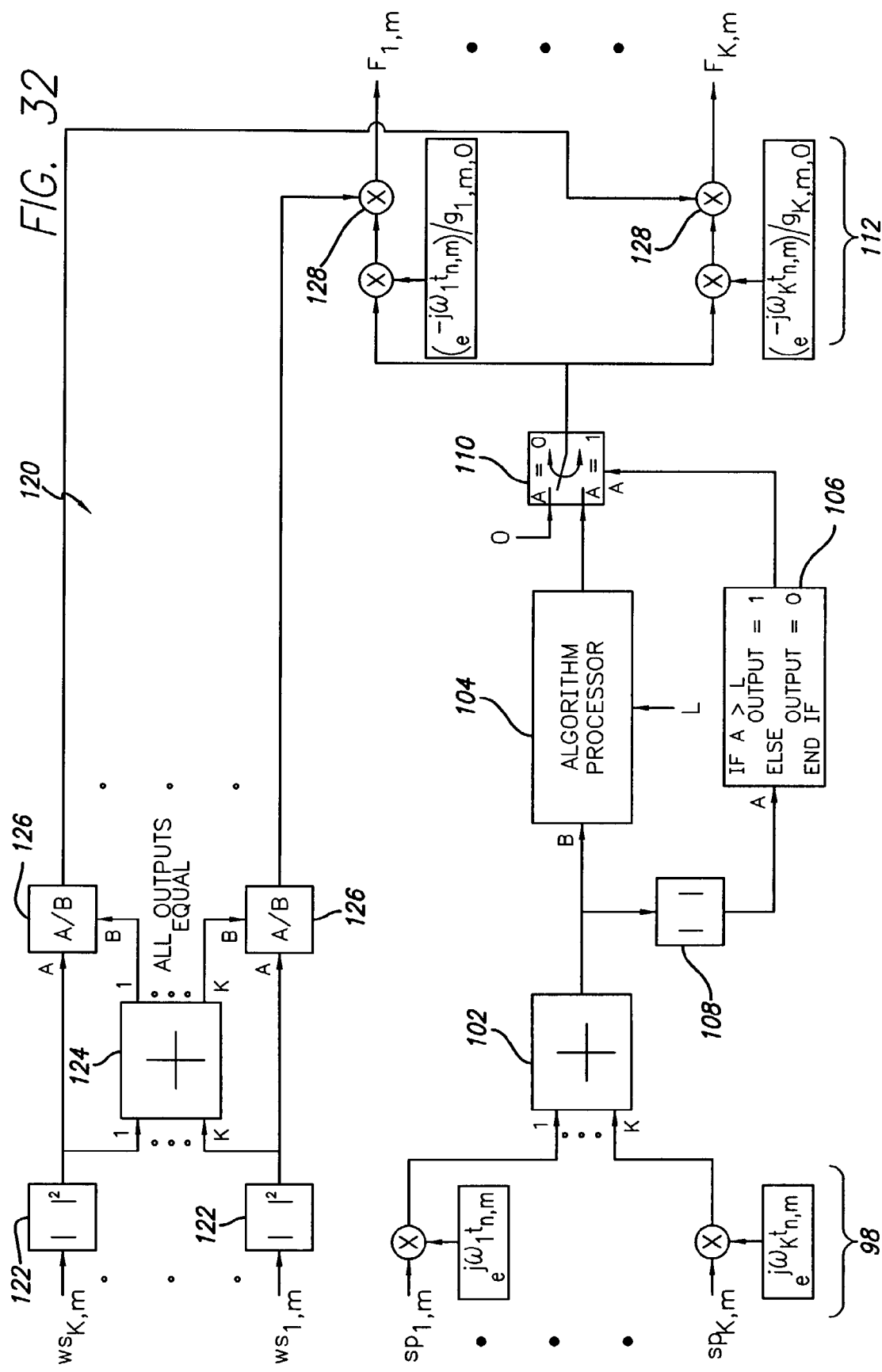
FIG. 32 is a block schematic drawing of an alternate embodiment of FIG. 17 modified to include the changes required when using different baseband filters in the individual carrier generation paths.

Referring to FIGS. 30–32, block schematic drawings of modified embodiments of the filter predictor and peak reduction algorithm block are shown. In these figures the circuitry is modified to include the changes required when using different baseband filters in the individual carrier generation paths. As mentioned previously, some multiple carrier communication systems use different baseband filters in each individual carrier generation path. These modifications are shown as examples so that similar modifications can be made by those skilled in the art to all drawings contained herein when generating multiple carrier signals with different baseband filters. When this is done, the functions $g_{m,N}$ must be modified to include an index for each individual carrier path or $g_{k,m,N}$. Unique coefficients, sampled with the appropriate upsampled coefficient index, are then provided to each multiplier 88 from the memory 56 of each filter predictor 54 in each individual carrier path, as shown in FIG. 30. Some minor modifications need also be made to the peak reduction block. These modifications are found in FIGS. 31–32 for two embodiments of the peak reduction algorithm block 58, corresponding to modified versions of FIGS. 15 and 17, respectively. When using the peak reduction implementation of FIGS. 31–32, Equation (1) may be used. If the peak reduction approach found in FIGS. 31–32 is used with the reduction Equation (5) and (6), these equations should, be modified using Equation (10) below. The rest of the operation of the implementation of FIGS. 30–32 will be appreciated from the previous discussion of FIGS. 10, 15 and 17 and like numerals are employed in FIGS. 30–32.

$$C=(A-gA) \quad (10)$$

Figure 33:
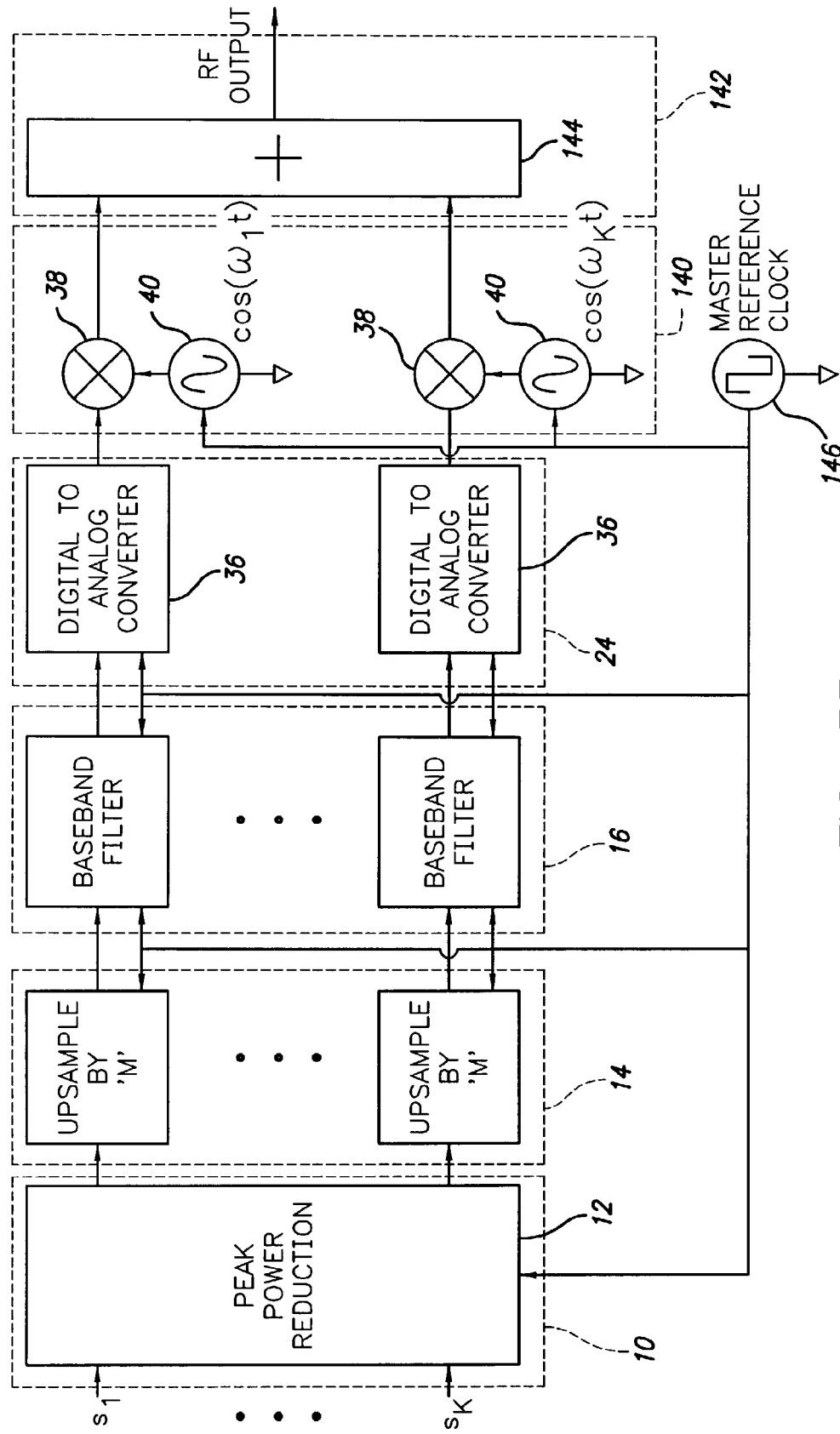
FIG. 33 is a block schematic drawing illustrating an alternate embodiment of the present invention in a multiple carrier communication system utilizing separate digital-to-analog converters, separate RF up-converting mixers and RF signal combination.

Referring to FIG. 33, an additional alternate embodiment of the invention will next be described. FIG. 2 described above illustrates an application of the present invention in multiple carrier signal generation employing digital-to-analog conversion after signal combination. The previously described embodiments of the peak reduction unit of the present invention solve the peak power problems associated with such digital-to-analog conversion after multiple carrier combination. One problem not specifically addressed above is signal to noise reduction per carrier as additional carriers are added. When an output signal is produced by digital-to-analog conversion, the signal is not smooth but produced in steps. These steps are produced because the digital-to-analog converter must hold the output signal constant between the digitized time intervals. These digital steps produce noise at the output of the digital-to-analog converter that is spread over frequency. Given the number of digital-to-analog converter bits, this noise level will remain relatively constant at the output of the digital-to-analog converter. As additional carrier channels are added in a system as shown in FIG. 2, the power per carrier drops. This means that as carriers are added the signal to noise ratio per carrier drops. To eliminate this problem with digital-to-analog converters in multiple carrier communication systems, each carrier can be provided with its own digital-to-analog converter, up-converted in frequency with its own local oscillator and combined at RF.

Referring to FIG. 33, an embodiment of the present invention is shown with multiple carrier generation where carrier combination is performed at RF. As. illustrated, after the peak reduction stage 10, the signal generation proceeds to an upsampling stage 14 and a filtering stage 16 as described above in relation to FIG. 2. After the filtering stage, however, the digital-to-analog conversion stage 24 provides a separate digital analog converter 36 for each carrier. The plural analog signal paths are then provided to a combined frequency offset and up-conversion stage 140. At this stage 140 each analog signal path, corresponding to the multiple carriers, is up-converted through an RF local oscillator 40 and mixer 38 with each oscillator having a carrier frequency $\omega_k$ corresponding to the carrier k. The RF signals are then combined at the combining stage 142 through an RF combiner 144. To accomplish peak power reduction using the previously described embodiments of peak reduction unit 12, both the digital processes and the up-converting local oscillators must be slaved off the same master reference clock 146 as illustrated in FIG. 33. The local oscillators must not be just frequency locked or phase locked but both frequency and phase locked to a master reference clock. This local oscillator control can be best accomplished using direct digital synthesis of each local oscillator. If direct digital synthesis is used it may also be helpful to generate the combined output not at RF but at a lower IF frequency and then block up-convert the IF carrier frequencies to RF.

A number of different embodiments of the present invention have been described in relation to the various figures. Nonetheless, it will be appreciated by those skilled in the art that a variety of additional embodiments are possible within the teachings of the present invention. For example, a variety of specific circuits implementing specific algorithms may be provided employing the teachings of the present invention and limitations of space prevent an exhaustive list of all the possible circuit implementations or an enumeration of all possible algorithms. A variety of other possible modifications and additional embodiments are also clearly possible and fall within the scope of the present invention. Accordingly, the described specific embodiments and implementations should not be viewed as in any sense limiting in nature and are merely illustrative of the present invention.

What is claimed is:

1. A method for multiple carrier communication with reduced signal peaks, comprising:
   providing a plurality of separate carrier signals each comprising a stream of carrier symbols corresponding to one or more data channels;
   providing a filtering operation on each of said separate carrier signals based on a filter impulse response function;
   performing a peak reduction processing on said plurality of carrier signals prior to said filtering operation, said peak reduction processing comprising receiving said carrier symbols corresponding to said separate carrier signals, providing predicted results of said filtering operation for each of said plurality of separate carrier signals using filter coefficient values corresponding to samples of the filter impulse response function, determining peak reduction values for each stream of carrier symbols based on the predicted results of said filtering operation, and combining the peak reduction values and carrier symbols to provide peak adjusted carrier symbols;
   frequency offsetting the plurality of separate carrier signals to provide frequency offset carrier signals; and
   combining the frequency offset carrier signals to provide a multi-carrier output.

2. A method for peak reduced multiple carrier communication as set out in claim 1, further comprising converting the multi-carrier output to a multi-carrier analog signal and mixing the multi-carrier analog signal with an RF carrier and providing a multi-carrier RF output.

3. A method for peak reduced multiple carrier communication as set out in claim 1, further comprising increasing the sampling rate of the peak adjusted carrier symbols prior to said filtering operation, wherein the up sampled symbols are filtered at the up sampled filter rate.

4. A method for peak reduced multiple carrier communication as set out in claim 1, wherein said peak reduction processing further comprises delaying the carrier symbols so that the peak reduction values and the carrier symbols are combined on a symbol-by-symbol basis in a time synchronized manner.

5. A method for peak reduced multiple carrier communication as set out in claim 1, wherein said filtering operation employs different filter impulse response functions for at least some of the plural carrier signals and wherein the filter predicting employs filter coefficients corresponding to the different filter impulse response functions.

6. A method for peak reduced multiple carrier communication as set out in claim 1, wherein said peak reduction processing further comprises weighting the peak reduction values based on the instantaneous power of each carrier.

7. A method for peak reduced multiple carrier communication as set out in claim 1, wherein the peak reduction values each comprise a gain which is multiplied by the carrier symbol to provide the peak adjusted carrier symbol.

8. A method for peak reduced multiple carrier communication as set out in claim 1, wherein the peak reduction values each comprise a value which is added to the carrier symbol to provide the peak adjusted carrier symbol.

9. A method for signal peak reduction in a multiple carrier communication system where the separate carrier signals are produced from input symbols that are filtered to reduce individual carrier bandwidths employing at least one filter impulse response function, offset in frequency, and combined into an output signal, comprising:

receiving said input symbols corresponding to said separate carrier signals;

providing predicted results of said filtering for each of said plurality of separate carrier signals using filter coefficient values corresponding to samples of the filter impulse response function;

determining peak reduction values for the input symbols based on the predicted results of said filtering operation; and combining the peak reduction values and carrier symbols to provide peak adjusted carrier symbols.

10. A method for signal peak reduction as set out in claim 9, further comprising delaying the carrier symbols so that the peak reduction values and the carrier symbols are combined on a symbol-by-symbol basis in a time synchronized manner.

11. A method for signal peak reduction as set out in claim 9, wherein said filtering employs different filter impulse response functions for at least some of the plural carrier signals and wherein the filter predicting employs filter coefficients corresponding to the different filter impulse response functions.

12. A method for signal peak reduction as set out in claim 9, further comprising weighting the peak reduction values based on the instantaneous power of each carrier.

13. A method for signal peak reduction as set out in claim 9, wherein the peak reduction values each comprise a gain which is multiplied by the carrier symbol to provide the peak adjusted carrier symbol.

14. A method for signal peak reduction as set out in claim 9, wherein the peak reduction values each comprise a value which is added to the carrier symbol to provide the peak adjusted carrier symbol.

15. A method for signal peak reduction in a multiple carrier communication system, comprising:

receiving a plurality of signals corresponding to plural carriers of a communication system; and applying a peak reduction processing to the plural carrier signals to provide peak reduction signals, wherein the strength of the peak reduction signals varies between at least some of the carriers as a function of carrier instantaneous power.

16. A method for signal peak reduction in a multiple carrier communication system as set out in claim 15, wherein said peak reduction processing comprises: determining a common peak correction value for the plural carriers, weighting the common correction value separately for one or more of the plural carriers to provide one or more weighted correction values, and providing a different peak reduction signal strength to at least some of the plural carriers using the one or more weighted correction values.

17. A method for signal peak reduction in a multiple carrier communication system as set out in claim 16, wherein determining a common peak correction value for the plural carriers comprises: combining the plural carrier signals to provide a combined signal, comparing the signal power of the combined signal to a threshold, and providing a common peak correction value if the signal power of the combined signal exceeds the threshold.

18. A method for signal peak reduction in a multiple carrier communication system as set out in claim 16, wherein each of said plurality of carrier signals comprises a stream of discrete symbols and wherein said weighting is performed on a symbol by symbol basis.

19. A method for signal peak reduction processing in a multiple carrier communication system, comprising:

receiving data corresponding to plural carrier signals of a communication system;

determining the combined signal power of the plural carrier signals;

determining the signal power of the individual carrier signals; and providing separate power weighted peak corrections for at least some of the carrier signals based on the combined signal power and the power of the individual carrier signals.

20. A method for signal peak reduction processing in a multiple carrier communication system as set out in claim 19, further comprising combining the signal powers of the individual carriers to derive a total average signal power, and wherein said providing separate power weighted peak corrections comprises: determining a ratio of the power of each of the individual carrier signals to the total average signal power to provide plural power weighting signals and using said plural power weighting signals to provide the separate power weighted peak corrections.

21. A method for signal peak reduction in a multiple carrier communication system as set out in claim 20, wherein providing separate power weighted peak corrections further comprises determining a peak correction value based on the combined signal power and multiplying the peak correction value by said plural power weighting signals.

22. A method for signal peak reduction processing in a multiple carrier communication system as set out in claim 19, wherein determining the signal power of the individual carrier signals comprises determining the instantaneous signal power.

23. A method for signal peak reduction processing in a multiple carrier communication system as set out in claim 19, wherein determining the signal power of individual carrier signals comprises determining signal power averaged over time.

24. A method for signal peak reduction processing in a multiple carrier communication system as set out in claim 21, wherein said input data comprises one or more streams of discrete complex symbols.

25. A method for signal peak reduction processing in a multiple carrier communication system as set out in claim 24, further comprising providing a plurality of separate phase adjustments to said correction value, and wherein providing separate power weighted peak corrections comprises providing a plurality of separate complex peak corrections having a magnitude based on said correction value and said power weighting signals and a phase based on said separate phase adjustment.

26. A signal peak reduction processing circuit adapted for use in a multi-carrier communication system, comprising:

a peak reduction processor coupled to receive data corresponding to a plurality of multi-carrier communication signals and providing a plurality of peak reduction correction signals having the same magnitude;

a weighting circuit, coupled to receive data corresponding to the plurality of multi-carrier communication signals and provide a plurality of power weighting signals corresponding to the power of individual ones of the plurality of carrier signals; and a combining circuit for combining the plurality of peak reduction correction signals and plurality of power weighting signals to adjust the magnitude of the peak reduction correction signals based on the power weighting signals.

27. A signal peak reduction circuit as set out in claim 26, wherein said weighting circuit comprises a plurality of power detection circuits providing a respective plurality of carrier power signals.

28. A signal peak reduction circuit as set out in claim 27, wherein said weighting circuit further comprises a summing circuit coupled to receive the plurality of carrier power signals and provide a combined carrier power signal.

29. A signal peak reduction circuit as set out in claim 28, wherein said weighting circuit further comprises a plurality of division circuits coupled to receive the combined carrier power signal and the respective plurality of carrier power signals and provide said plurality of weighting signals based on the ratio of the respective carrier power signals to the combined carrier power signal.

30. A signal peak reduction circuit as set out in claim 26, wherein said combining circuit comprises a plurality of multipliers.

* * * * *